United States Patent
Chen et al.

(10) Patent No.: US 9,496,939 B2
(45) Date of Patent: *Nov. 15, 2016

(54) ADAPTIVE TRANSMISSION MODE SWITCHING

(71) Applicant: Telefonaktiebolaget L M Ericsson (publ), Stockholm (SE)

(72) Inventors: Xixian Chen, Ottawa (CA); Peter Deane, Fitzroy Harbour (CA); Xiaoming Lai, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,465

(22) Filed: May 18, 2015

(65) Prior Publication Data

US 2015/0249490 A1    Sep. 3, 2015

Related U.S. Application Data

(63) Continuation of application No. 13/673,202, filed on Nov. 9, 2012, now Pat. No. 9,036,608.

(51) Int. Cl.
*H04W 4/00*       (2009.01)
*H04B 7/06*       (2006.01)
(Continued)

(52) U.S. Cl.
CPC ............ *H04B 7/063* (2013.01); *H04B 7/0413* (2013.01); *H04B 7/0456* (2013.01);
(Continued)

(58) Field of Classification Search
CPC ........ H04B 1/50; H04B 1/56; H04B 7/0617; H04B 7/04; H04B 7/063; H04B 7/0456; H04B 7/0413; H04W 52/40; H04W 84/12; H04W 88/08; H04W 80/04; H04W 88/06; H04W 84/18; H04W 24/10; H04W 72/02; H04L 2012/5608; H04L 1/0002; H04L 1/0009; H04L 1/0606; H04L 7/0689

USPC ............ 370/339, 334, 310.2, 338, 328, 331, 370/386

See application file for complete search history.

(56) References Cited

U.S. PATENT DOCUMENTS 8,098,752 B2    1/2012  Hwang et al. ................ 375/260
2008/0310338 A1  12/2008  Charpenter et al. .......... 370/315

(Continued)

OTHER PUBLICATIONS

PCT Notification of Transmittal of the International Search Report and the Written Opinion of the International Searching Authority, or the Declaration for International application No. PCT/IB2013/002359, Jun. 17, 2014.

(Continued)

*Primary Examiner* — Brenda H Pham
(74) *Attorney, Agent, or Firm* — Baker Botts, LLP

(57) ABSTRACT

A node (28) of a radio access network (20) communicates over a radio interface (32) with a wireless terminal (30). The node (28) comprises a transmitter (34) and a controller (40). The transmitter (34) selectively operates in plural multiple input multiple output (MIMO) modes for downlink transmission over the radio interface (32). The controller (40) uses both a terminal speed value and a throughput value to make a determination when to switch between the plural multiple input multiple output (MIMO) modes for communicating with the wireless terminal. The plural MIMO modes comprise a first mode and a second mode. In the first mode open loop MIMO operates with cyclical diversity delay. In the second mode open loop MIMO operates without cyclical diversity delay. Although operating in open loop MIMO, advantages such as those of closed loop MIMO are realized.

20 Claims, 9 Drawing Sheets

(51) Int. Cl.

| | |
|---|---|
| *H04W 24/10* | (2009.01) |
| *H04W 72/02* | (2009.01) |
| *H04B 7/04* | (2006.01) |
| *H04L 1/00* | (2006.01) |
| *H04L 1/06* | (2006.01) |

(52) U.S. Cl.
CPC ......... *H04B 7/0671* (2013.01); *H04B 7/0689* (2013.01); *H04L 1/0002* (2013.01); *H04L 1/0009* (2013.01); *H04L 1/0606* (2013.01); *H04W 24/10* (2013.01); *H04W 72/02* (2013.01)

(56) References Cited

U.S. PATENT DOCUMENTS

| | | | |
|---|---|---|---|
| 2009/0034639 A1 | 2/2009 | Hwang et al. | |
| 2009/0036150 A1 | 2/2009 | Liao et al. | 455/501 |
| 2010/0290553 A1 | 11/2010 | Li et al. | 375/267 |
| 2012/0093016 A1 | 4/2012 | Zhang et al. | 370/252 |
| 2012/0120840 A1 | 5/2012 | Liu | 370/252 |

OTHER PUBLICATIONS

3GPP TSG-RAN WG1 #50; Athens, Greece; Source: Nortel; Title: Rank Adaptation for Fixed Pre-Coding (R1-073297), Aug. 20-24, 2007.

3GPP TSG RAN WG1 #bis; Source: AT&T et al.; Title: Further Details of Large Delay CDD for E-UTRA (R1-080579), Jan. 14-18, 2008.

3GPP TSG-RAN WG1 #51bis; Source: Nortel; Title: System Level Simulation of Adaptive MIMO for High Speed UE (R1-080383), Jan. 14-18, 2008.

3GPP TS 36.211 V10.0.0 Technical Specification, 3rd Generation Partnership Project; Technical Specification Group Radio Access Network; "Evolved Universal Terrestrial Radio Access (E-UTRA); Physical Channels and Modulation" (Release 10), Dec. 2010.

3GPP TS 36.212 V10.0.0 Technical Specification, 3rd Generation Partnership Project; Technical Specification Group Radio Access Network; "Evolved Universal Terrestrial Radio Access (E-UTRA); Multiplexing and Channel Coding" (Release 10), Dec. 2010.

3GPP TS 36.213 V10.0.0 Technical Specification, 3rd Generation Partnership Project; Technical Specification Group Radio Access Network; Evolved Universal Terrestrial Radio Access (E-UTRA); Physical Layer Procedures (Release 10), Dec. 2010.

ADAPTIVE TRANSMISSION MODE SWITCHING

PRIORITY

This application is a continuation, under 35 U.S.C. §120, of U.S. application Ser. No. 13/673,202 filed Nov. 9, 2012, which is incorporated herein by reference.

TECHNICAL FIELD

The technology relates to wireless telecommunications, and particularly to the transmission of information using multiple antennas, including multiple input and multiple output (MIMO) transmission modes.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). UTRAN is essentially a radio access network using wideband code division multiple access for user equipment units (UEs). In a forum known as the Third Generation Partnership Project (3GPP), telecommunications suppliers propose and agree upon standards for third generation networks and UTRAN specifically, and investigate enhanced data rate and radio capacity. Specifications for the Evolved Universal Terrestrial Radio Access Network (E-UTRAN) are ongoing within the $3^{rd}$ Generation Partnership Project (3GPP). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

Recently cellular operators have begun offering mobile broadband based on the Long Term Evolution (LTE) wireless system. Fuelled by new devices designed for data applications, the end user performance requirements are steadily increasing. Consequently, techniques that enable cellular operators to utilize their spectrum resources more efficiently are of increasing importance. Table 1 shows various downlink transmission modes for Long Term Evolution (LTE), including various MIMO modes.

TABLE 1

| LTE Transmission Modes | |
| --- | --- |
| Transmission Mode | Downlink Transmission Scheme |
| Mode 1 | Single Antenna Port (SISO or SIMO) |
| Mode 2 | Transmit Diversity |
| Mode 3 | Open-Loop Spatial Multiplexing |
| Mode 4 | Closed-Loop Spatial Multiplexing |
| Mode 5 | Multi-User MIMO |
| Mode 6 | Closed-Loop Rank-1 Spatial Multiplexing |
| Mode 7 | Single Antenna Port Beamforming |
| Mode 8 | Dual-Layer Beamforming |

MIMO (multiple input and multiple output) is one of the key technologies that provides substantial improvements in spectral efficiency. MIMO involves the use of multiple antennas at both the transmitter and receiver to improve communication performance. MIMO offers significant increases in data throughput and link range without additional bandwidth or increased transmit power. To do so, MIMO spreads the same total transmit power over the antennas to achieve an array gain that improves the spectral efficiency (more bits per second per hertz of bandwidth) or to achieve a diversity gain that improves the link reliability (reduced fading).

Currently, there are two widely used MIMO techniques: OL-MIMO (open loop MIMO) and CL-MIMO (closed loop MIMO). As summarized in a white paper entitled "Maximizing LTE Performance Through MIMO Optimization" (http://rfsolutions.pctel.com/artifacts/MIMOWhitePaper-RevB-FINAL.pdf), open loop and closed loop modes differ in the level of detail and frequency with which channel conditions are reported by the UE. The eNodeB relies on detailed and timely information from the UE in order to apply the best antenna and data-processing techniques for the existing channel conditions. Depending on the UE's data-processing speed as well as the quality of its connection to the eNodeB in both uplink and downlink, LTE will operate in either closed loop or open loop mode.

The eNodeB communicates with a UE in open loop when the UE is moving too fast to provide a detailed report on channel conditions in time for the eNodeB to select a precoding matrix. Other factors, such as UE processing speed or uplink data capacity (which may also be affected by UE specifications), may result in open loop operations even when the UE is moving relatively slowly. The UE's capabilities are therefore crucial for achieving the best results from particular multipath conditions. In open loop operations, the eNodeB receives minimal information from the UE: (1) a Rank Indicator (RI) which indicates the number of layers that can be supported under the current channel conditions and modulation scheme; and (2) a Channel Quality Indicator (CQI) which is a summary of the channel conditions under the current transmission mode, and which roughly corresponds to the signal to noise ratio (SNR). The eNodeB then uses the CQI to select the correct modulation and coding scheme for the channel conditions. Combined with this modulation and coding scheme, CQI can also be converted into an expected throughput. The eNodeB adjusts its transmission mode and the amount of resources devoted to the UE based on whether the CQI and RI reported by the UE matches the expected values, and whether the signal is being received at an acceptable error rate.

In closed loop operations, the UE analyzes the channel conditions of each transmission (Tx), including the multipath conditions. In the closed loop MIMO, the receiver reports channel status to the transmitter via a special feedback channel, making it possible to respond to changing circumstances. In particular, in closed loop MIMO the UE provides a RI; one or two CQI reports depending on the RI value; and a Precoding Matrix Indicator (PMI).

Precoding is well known in the art and, in general, is applied to the data carried on the Physical Downlink Shared Channel (PDSCH) in order to increase the received Signal to Interference plus Noise power Ratio (SINR). This is done by setting different transmit antenna weights for each transmission layer (stream) using channel information fed back from the UE. The ideal transmit antenna weights for precoding are generated from eigenvector(s) of the covariance matrix of the channel matrix, H, given by $HH^H$, where $^H$ denotes the Hermitian transpose. LTE Rel. 8 uses codebook-based precoding, in which the best precoding weights among a set of predetermined precoding matrix candidates (a codebook) is selected to maximize the total throughput on all layers after precoding, and the index of this matrix (the Precoding Matrix Indicator (PMI)) is fed back to the base station (eNode B).

FIG. 9A illustrates some basic aspects of conventional closed loop MIMO operation. Act A-1 of FIG. 9A shows the wireless terminal sending one or more report(s) of numerous parameters (including RI, the Precoding Matrix Indicator (PMI), HARQ ACK/NAK, and CQIs for two codewords) to the node. As act A-2 the base station node evaluates the wireless terminal's reports. Act A-3 comprises the base station node making its decision regarding the appropriate transmission mode. Then, as act A-4, the base station node communicates its decision of the transmission mode to the wireless terminal using higher layer signaling. Upon receipt of the transmission mode decided by the base station node as act A-5 the wireless terminal implements and acknowledges the transmission mode decided by the base station node. Until the time of such acknowledgement, the base station operates with some ambiguity. Upon receipt of the confirmation from the wireless terminal, as act A-6 the base station node then begins to schedule transmissions to the wireless terminal using the new transmission mode, e.g., the transmission mode decided at act A-3. Aspects of conventional open loop MIMO employ acts similar to those shown in FIG. 9A, it being understood, however, that in open loop MIMO for act A-1 the wireless terminal does not transmit the PMI and for each parameter transmits a value averaged over two codewords rather than value for each of two codewords.

Simulation results appear to indicate that CL-MIMO has better performance than OL-MIMO when the mobile speed is low. However, when the mobile speed is high, the advantage of CL-MIMO vanishes.

Given the fact that in CL-MIMO, the receiver reports channel status on an uplink control channel to the transmitter, a problem with conventional CL-MIMO in LTE is that the uplink control channel overhead increases in direct proportion to the number of users. Specifically, LTE CL-MIMO requires two channel quality (CQI) reports plus one PMI report per user.

For a given UE the LTE system can switch between the CL-MIMO and OL-MIMO modes. But the transition or switching may be slow. The transition between modes requires Radio Resource Control (RRC) signaling which (typically) takes 100s of milliseconds. This reduces the ability of LTE to respond to rapidly changing radio frequency (RF) channel conditions, which in turn impacts system capacity.

SUMMARY

In one of its aspects the technology disclosed herein concerns a node of a radio access network which communicates over a radio interface with a wireless terminal comprises a transmitter and a controller. The transmitter selectively operates in plural transmission modes for downlink transmission over the radio interface, at least one of the plural transmission modes being a multiple input multiple output (MIMO) transmission mode. The controller uses both a terminal speed value and a throughput value to make a determination when to switch between the plural transmission modes for communicating with the wireless terminal.

In an example embodiment the plural transmission modes include plural MIMO modes. The plural MIMO modes comprise a first mode and a second mode. In the first mode open loop MIMO operates with cyclical diversity delay. In the second mode open loop MIMO operates without cyclical diversity delay. In basic operation, the controller is configured to determine in which of the plural modes the node is to operate with respect to the wireless terminal by performing basic act (1) through basic act (4). Basic act (1) and basic act (2) are performed when the node is in the first mode; basic act (3) and basic act (4) are performed when the node is in the second mode.

Of the first mode acts, basic act (1), which depends on the terminal speed value, comprises keeping the downlink transmission in the first mode if the terminal speed value exceeds a terminal speed threshold. Basic act (2) is performed when the terminal speed value is below the terminal speed threshold, and comprises two sub-acts. Sub-act (2a) comprises switching the downlink transmission to the second mode when a first mode throughput value exceeds a throughput threshold. Sub-act (2b) comprises keeping the downlink transmission in the first mode when the first mode throughput value does not exceed the throughput threshold.

Of the second mode acts, basic act (3), which also depends on the terminal speed value, comprises switching the downlink transmission to the first mode if the terminal speed value exceeds the terminal speed threshold. Basic act (4) is performed in the second mode when the terminal speed value does not exceed the terminal speed threshold, and comprises two sub-acts. Sub-act (4a) comprises switching the downlink transmission to the first mode when a second mode throughput value does not exceed the throughput threshold. Sub-act (4b) comprises keeping the downlink transmission in the second mode when the second mode throughput value does exceed the throughput threshold.

In an example embodiment, in the first mode the controller is configured to use a first precoding matrix indicator to determine a first mode/first PMI throughput value which is used for the first mode throughput value when performing acts (1) and (2); and to use a second precoding matrix indicator to determine a first mode/second PMI throughput value which is used for the first mode throughput value then performing acts (1) and (2). If the first mode/first PMI throughput value exceeds the first mode/second PMI throughput value, the controller is configured to use the first mode/first PMI throughput value as the first mode throughput value when repeating acts (1) and (2). If the first mode/first PMI throughput value does not exceed the first mode/second PMI throughput value, the controller is configured to the first mode/second PMI throughput value as the first mode throughput value when repeating acts (1) and (2). In an example implementation wherein feedback is obtained for both a first codeword and a second codeword transmitted on the downlink, the controller is further configured to determine at least one of the first mode/first PMI throughput value and the first mode/second PMI throughput value by the sum of the first codeword throughput value and the second codeword throughput value.

In an example embodiment, in the second mode the controller is configured to use a first precoding matrix indicator to determine a second mode/first PMI throughput value which is used for the second mode throughput value when performing act (3) and to use a second precoding matrix indicator to determine a second mode/second PMI throughput value which is used for the second mode throughput value when performing act (3). The controller is configured to perform the following further acts when in second first mode and when the terminal speed value does not exceeds the terminal speed threshold: compare a maximum of the second mode/first PMI throughput value and the second mode/second PMI throughput value to the throughput threshold; if the maximum of the second mode/first PMI throughput value and the second mode/second PMI throughput value does not exceed the throughput threshold, switch the downlink transmission to the first mode; but otherwise when the maximum of the second mode/first PMI throughput value and the second mode/second PMI throughput value is the second mode/first PMI throughput value, repeat act (3) using the second mode/first PMI throughput value as the second mode throughput value, or when the maximum of the second mode/first PMI throughput value and the second mode/second PMI throughput value is the second mode/second PMI throughput value, repeat act (3) using the second mode/second PMI throughput value as the second mode throughput value.

In an example embodiment and mode the controller is configured to estimate the throughput value by (1) using a channel quality indication reported by the wireless terminal to determine a signal to interference plus noise ratio (SINR): (2) deriving a channel gain to interference noise ratio (GINR) from the SINR by subtracting a power spectrum density of a reference signal ($PSD_{RS}$); (3) applying a smoothing filter to the GINR to obtain a smoothed GINR value; (4) using HARQ ACK/NACK feedback to adjust the GINR to obtain an adjusted GINR; (5) using the smoothed GINR value, the adjusted GINR value, and a power spectrum density of a PDSCH signal to obtain the throughput value for each codeword. The controller is configured to add the throughput value for a first codeword and a second codeword to obtain a final throughput value for the multiple input multiple output (MIMO) mode.

In example embodiments and modes, various example techniques are provided for the controller to determine the GINR adjusted value.

In an example embodiment and mode, the controller is configured to use HARQ feedback to adjust the throughput value.

In an example embodiment and mode, a transmitter of the base station node communicates the determination to the wireless terminal using channel condition-contemporaneous physical layer signaling.

In an example embodiment and mode, the plural transmission modes further comprise a third mode which is a rank one mode, and wherein the node is further configured to use a rank indicator value and/or the terminal speed value to make the determination when to switch the downlink transmission to or away from the rank one mode.

Example methods of operating a base station node and a communications network are also provided.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1A:
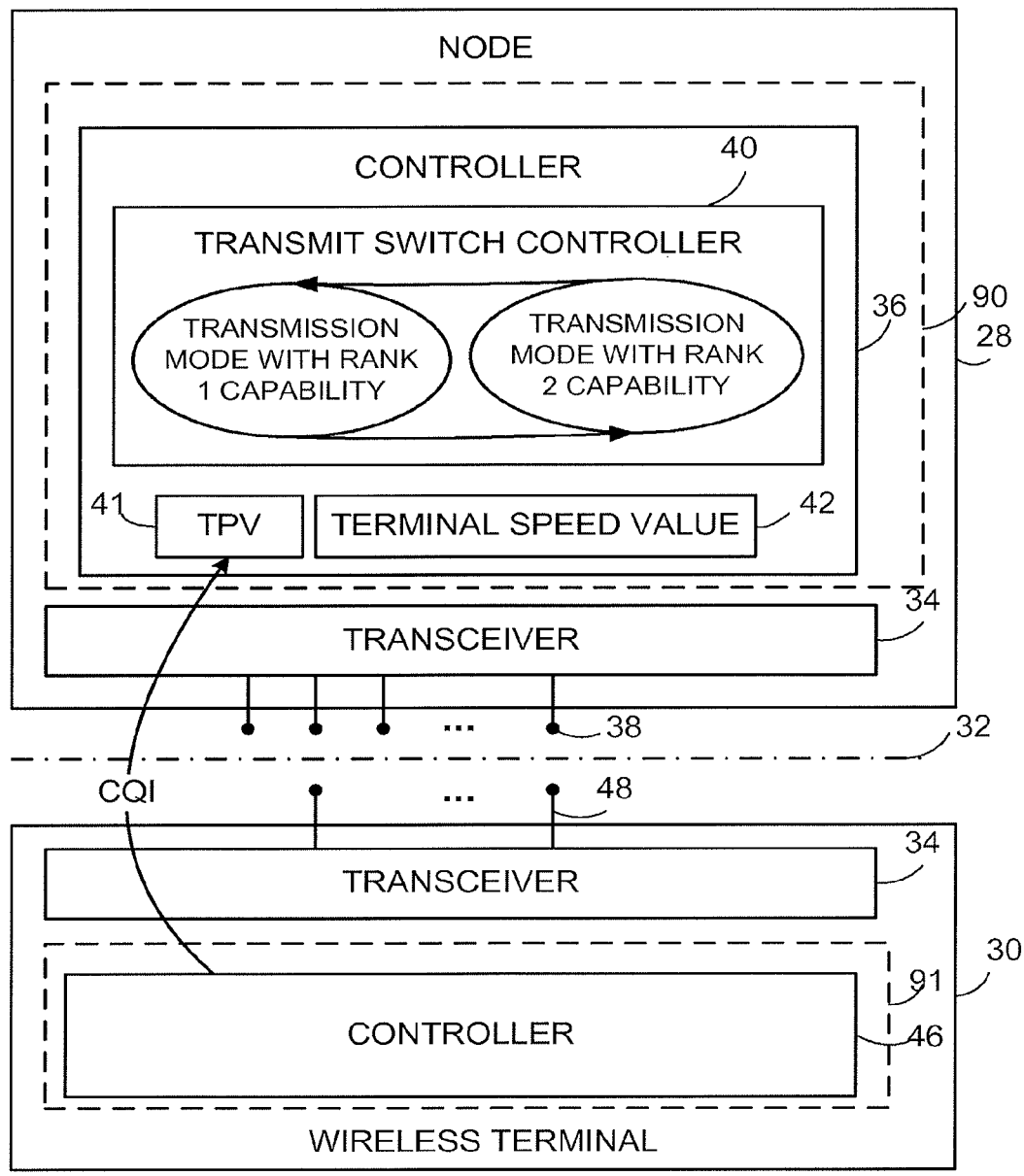
FIG. 1A is a schematic view of a communications system including a node which communicates over a radio interface with a wireless terminal and which switches between plural MIMO transmission modes.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above. The technology can additionally be considered to be embodied entirely within any form of computer-readable memory, such as solid-state memory, magnetic disk, or optical disk containing an appropriate set of computer instructions that would cause a processor to carry out the techniques described herein.

FIG. 1A shows an example radio communications network 20 comprising a node 28 and at least one wireless terminal 30. The node 28 communicates with at least one, and typically many, wireless terminals over radio interface 32. In basic construction pertinent to the present technology, node 28 comprises transmitter 34 and controller 36. The transmitter 34 selectively operates in plural transmission modes for downlink transmission over radio interface 32 to wireless terminal 30. At least one of the plural transmission modes is a mode with rank 1 (R1) transmission capability; at least another of the plural transmission modes is a mode with transmission capability greater than rank 1, e.g., a multiple input multiple output (MIMO) mode. As such, transmitter 34 comprises plural antennae 38. The antennae 38 are fed respective signals which have been processed for transmission.

The node 28 may be any type of radio access node which transmits over radio interface 32 to a wireless terminal. For example, node 28 may be a base station node, either macro or micro (such as a femto or pico base station, for example). The node 28 may be either a donor node or a relay node. The node 28 is not confined to any particular radio access network technology, although in the illustrated embodiments it has particularly beneficial employment in Long Term Evolution (LTE). Moreover, it will be appreciated that node 28 typically has other units or elements not illustrated in FIG. 1B, such as (for example) interfaces to other nodes (e.g., other base stations) and interfaces to other networks, such as one or more core networks.

The controller 36 may control or supervise some or all of the operational aspects of node 28, including such operational aspects as establishing one or more bearers for communication between node 28 and wireless terminal 30; scheduling of frames for transmission on a downlink (DL) from node 28 to wireless terminal 30 and/or frames for transmission on an uplink (UL) from wireless terminal 30 to node 28; formatting such frames for transmission on the downlink (DL) and processing frames received on the uplink (UL); power control for one or both of node 28 and wireless terminal 30; diversity combining; and handover, just to name a few. For the technology disclosed herein, the controller 36 includes control logic for making a determination when to switch between the plural transmission modes. For convenience, such control logic and the apparatus which store or host the control logic are also referred to as transmit switch controller 40.

The transmission modes of the example embodiment of FIG. 1 may be any of the transmission modes of Table 1. However, at least one of the transmission modes preferably has rank 1 (R1) transmission capability, e.g., a rank one transmission sub-mode, and at least another of the transmission modes has transmission capability greater than rank one, e.g., is a multiple input multiple output (MIMO) transmission mode. As an example, a transmission mode with rank 2 capability is shown in FIG. 1A. Transmission modes particularly suitable for the technology disclosed herein are transmission modes 4, 7, and 8 of Table 1, although other transmission modes may also be employed.

Figure 1B:
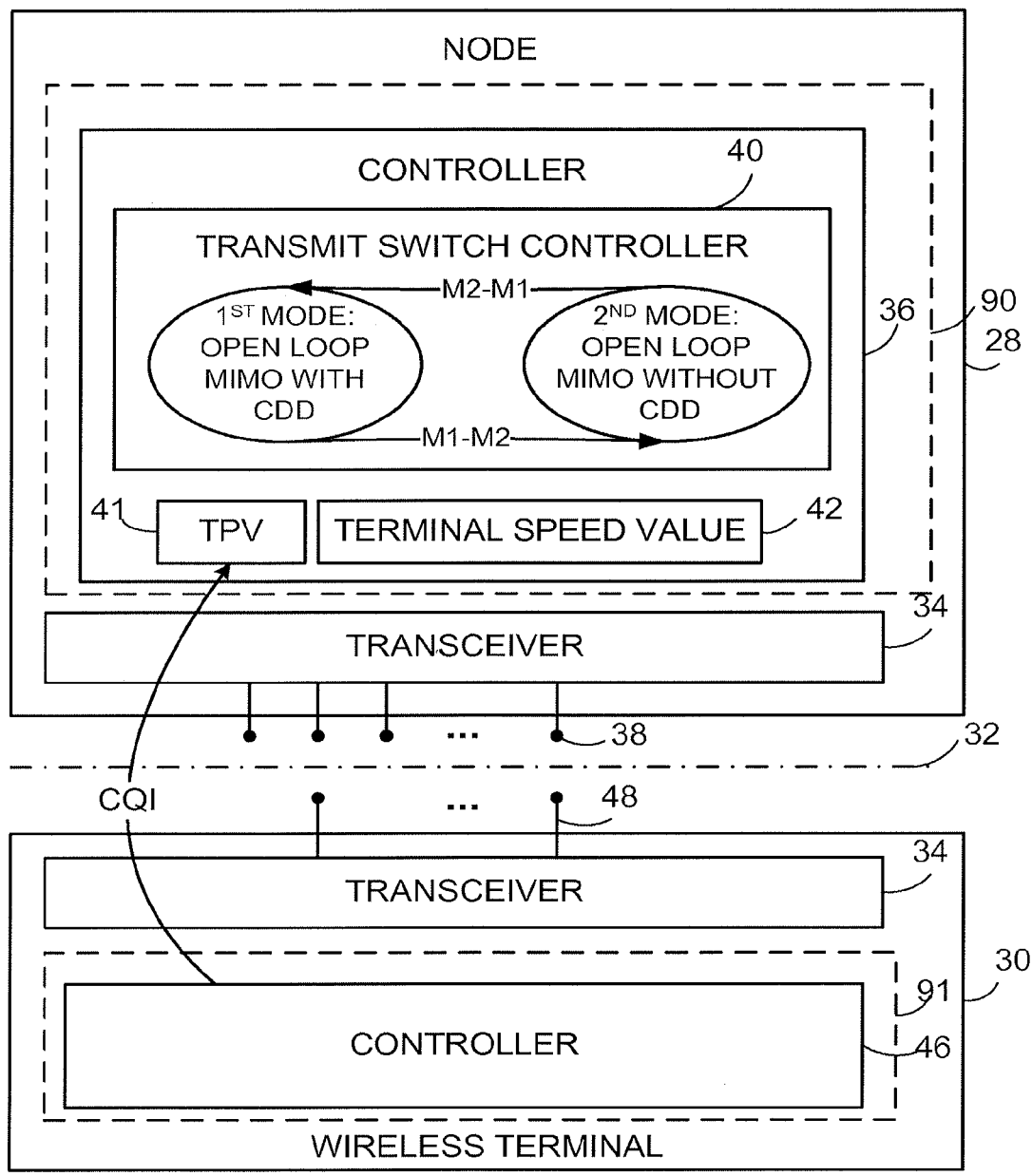
FIG. 1B is a schematic view of a communications system including a node which communicates over a radio interface with a wireless terminal and which switches between plural MIMO modes.

FIG. 1B shows a specific case of the example embodiment of FIG. 1A, again showing an example radio communications network 20 comprising a node 28 and at least one wireless terminal 30. In basic construction node 28 of FIG. 1B also comprises transmitter 34 and controller 36. The transmitter 34 of FIG. 1B selectively operates in plural multiple input multiple output (MIMO) modes for downlink transmission over radio interface 32 to wireless terminal 30. As such, transmitter 34 also comprises plural antennae 38. The antennae 38 are fed respective signals which have been processed for transmission according to, e.g., MIMO techniques. Since the dual antenna configuration is the most widely used in LTE networks, the examples of the present disclosure focus on the dual antenna scenario. However, the basic techniques disclosed herein may also be applied to other antenna configurations.

As understood by the person skilled in the art, 2×2 MIMO transmission generally involves mapping of modulated symbols to two spatial layers from two codewords; precoding (multiplying the signal using a precoding matrix with size 2×2); mapping both sets of precoded values onto resource elements of a frame; generating OFDM signals to express the resource elements; and, applying the OFDM signals to two antenna ports of the MIMO antenna array. In an example embodiment, the foregoing MIMO functions may be performed by controller 36 of node 28.

In a basic example embodiment, the plural MIMO modes in which transmitter 34 selectively operates includes a first mode and a second mode. The first mode is open loop MIMO which operates with cyclical diversity delay. The second mode is open loop MIMO which operates without cyclical diversity delay. One or both of the first mode and the second mode may have rank 1 (R1) capability. As is known in the art, Cyclic Delay Diversity (CDD) is a diversity scheme used in OFDM-based telecommunication systems, transforming spatial diversity into frequency diversity avoiding inter-symbol interference (ISI). In essence, CDD shifts the transmit signal in the time direction and transmits the modified (e.g., shifted) signal copies over separate transmit antennas. The transmit-antenna specific signal modifications, i.e., the time shifts, are inserted cyclically, such that no additional inter symbol interference (ISI) occurs.

In terms of the switch of MIMO modes, for a first example embodiment FIG. 1B shows both the first mode (open loop MIMO which operates with cyclical diversity delay) and the second mode (open loop MIMO which operates without cyclical diversity delay) and further illustrates by arrows switches between the modes. For example, arrow M1-M2 illustrates a switch from the first mode to the second mode, and arrow M2-M1 illustrates a switch from the second mode to the first mode. According to the technology disclosed herein, in general the first mode (open loop MIMO which operates with cyclical diversity delay) is used when there is a sufficiently high terminal speed, which indicates that the speed of the wireless terminal 30 is high and the channel is changing quickly. Under such (high Doppler) conditions, there is no benefit to change PMI.

Figure 2:
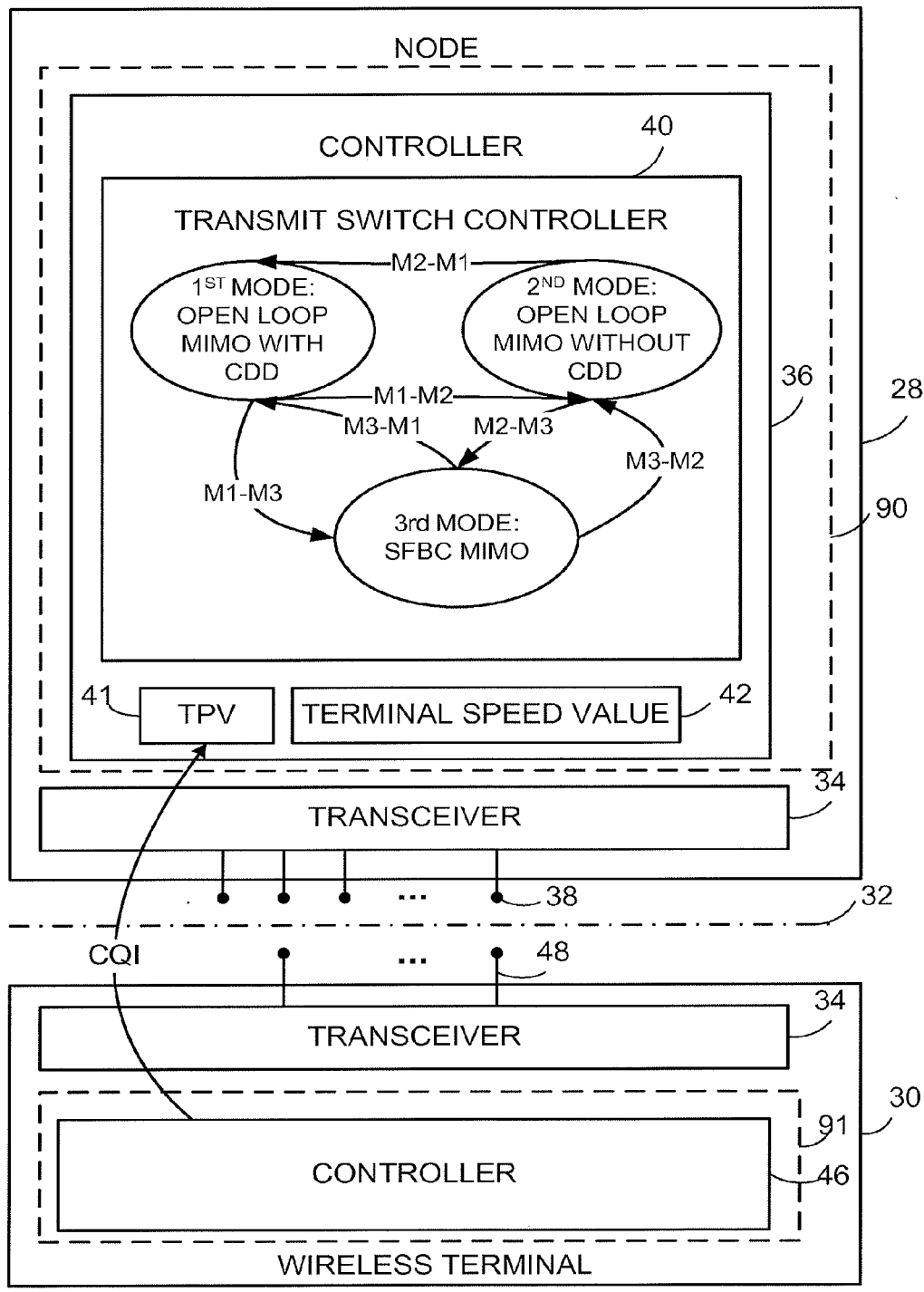
FIG. 2 is a schematic view of a communications system including a node which communicates over a radio interface with a wireless terminal and which switches between three MIMO modes.

FIG. 2 shows, for another example embodiment, that the plural MIMO modes may also include other modes, such as a third mode. In the example of FIG. 2B the third mode happens to be a rank one mode (RI=1), such as a space frequency block code (SFBC) mode, although other rank one (R1) modes could be involved in the switching as well (such as beamforming or transmission mode 4, rank 1, for example). As such, FIG. 2 further shows by arrow M1-M3 a switch from the first mode to the third mode; by arrow M2-M3 a switch from the second mode to the third mode; by arrow M3-M1 a switch from the third mode to the second mode; and, by arrow M3-M2 a switch from the third mode to the second example embodiment. Thus, the second example embodiment thus involves transmission mode 3 of OL-MIMO (see Table 1) with large CDD and SFBC and transmission mode 4 of CL-MIMO in this work. In the technology disclosed herein, the closed loop MIMO is replaced by the OL-MIMO without CDD (in which PMI is not required to be sent from UE). Using the technology disclosed herein, the best transmission scheme is selected adaptively to achieve optimum performance.

It should be appreciated that more than three modes may be utilized. For example, in another example embodiment the three modes of FIG. 2 may be utilized, and other modes as well. Such other modes may include, for example, transmission mode 4 (Rank 1), transmission mode 7, and transmission mode 8 from Table 1.

As described herein in more detail, transmit switch controller 40 uses both a throughput value (e.g., TPV 41) and a terminal speed value (terminal speed value [TSV] 42) and to make a determination when to switch between the plural transmit modes, for communicating with the wireless terminal 30. As used herein, "throughput" or "throughput value" is a number of information bits per resource element (RE). The throughput value may be different, e.g., differently determined, for different MIMO modes.

In an example implementation, the terminal speed value may be a Doppler shift value obtained with reference to the wireless terminal. It can be derived by comparing the phase changes between two reference symbols. As an alternative to a Doppler measurement the Transmit switch controller 40 may also use the filtered time adjustment to estimate the UE speed. For example, the rate of delay change (distance) can be used to estimate the terminal speed (Doppler).

FIG. 1B also shows some non-exhaustive details of wireless terminal 30, including a MIMO-compatible transceiver 44 and wireless terminal controller 46. The transceiver 44 comprises an appropriate antenna structure 48 as well as signal processing circuitry for signals received from node 28 on the downlink (DL) and circuitry for preparing signals for transmission to node 28 on the uplink (UL). The controller 36 processes data received (e.g., in frames) on the downlink (DL) and prepares frames for transmission on the uplink (UL); cooperates in a power control loop; and provides various reports and information to node 28, including the channel quality indicator or index (CQI) upon which a channel gain to interference noise ratio (GINR) is based.

Figure 3:
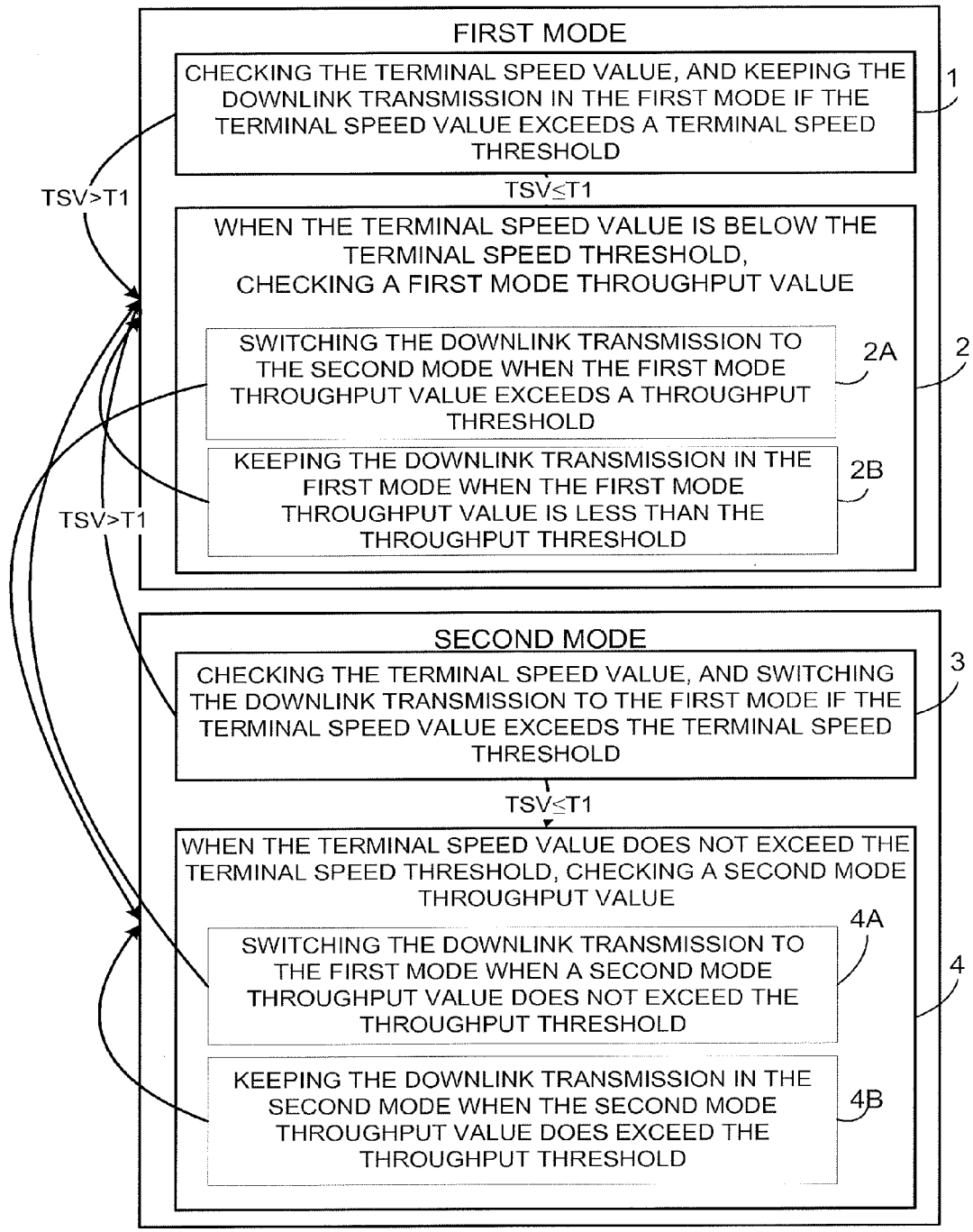
FIG. 3 is a flowchart showing basic acts performed by a MIMO mode switch controller according to an example embodiment.

In basic operation, transmit switch controller 40 is configured to determine in which of the plural transmit modes the node is to operate with respect to downlink transmissions to the wireless terminal by performing basic act (1) through basic act (4) of FIG. 3. Basic act (1) and basic act (2) are performed when the node is in the first mode; basic act (3) and basic act (4) are performed when the node is in the second mode.

Of the first mode acts, basic act (1) of FIG. 3, comprises checking the terminal speed value (TSV), and then keeping the downlink transmission in the first mode if the downlink (DL) transmission is at that time in the first mode and the terminal speed value exceeds a terminal speed threshold ((TSV>T1). Basic act (2) is performed when the terminal speed value does not exceed the terminal speed threshold (TSV<T1), comprises checking a first mode throughput value (TPV$_1$), and further comprises two sub-acts. Sub-act (2a) comprises switching the downlink transmission to the second mode when the first mode throughput value (TPV$_1$) exceeds a throughput threshold (T2). Sub-act (2b) comprises keeping the downlink transmission in the first mode when the first mode throughput value (TPV$_1$) is less than the throughput threshold (T2).

Of the second mode acts, basic act (3), which also depends on and involves checking the terminal speed value, comprises switching the downlink transmission to the first mode if the terminal speed value exceeds the terminal speed threshold (TSV>T1). Basic act (4) is performed in the second mode when the terminal speed value does not exceed the terminal speed threshold (TSV≤T1), and comprises two sub-acts. Sub-act (4*a*) comprises switching the downlink transmission to the first mode when a second mode throughput value (TPV$_2$) does not exceed the throughput threshold (T2). Sub-act (4*b*) comprises keeping the downlink transmission in the second mode when the second mode throughput value (TPV$_2$) does exceed the throughput threshold (T2).

Figure 4:
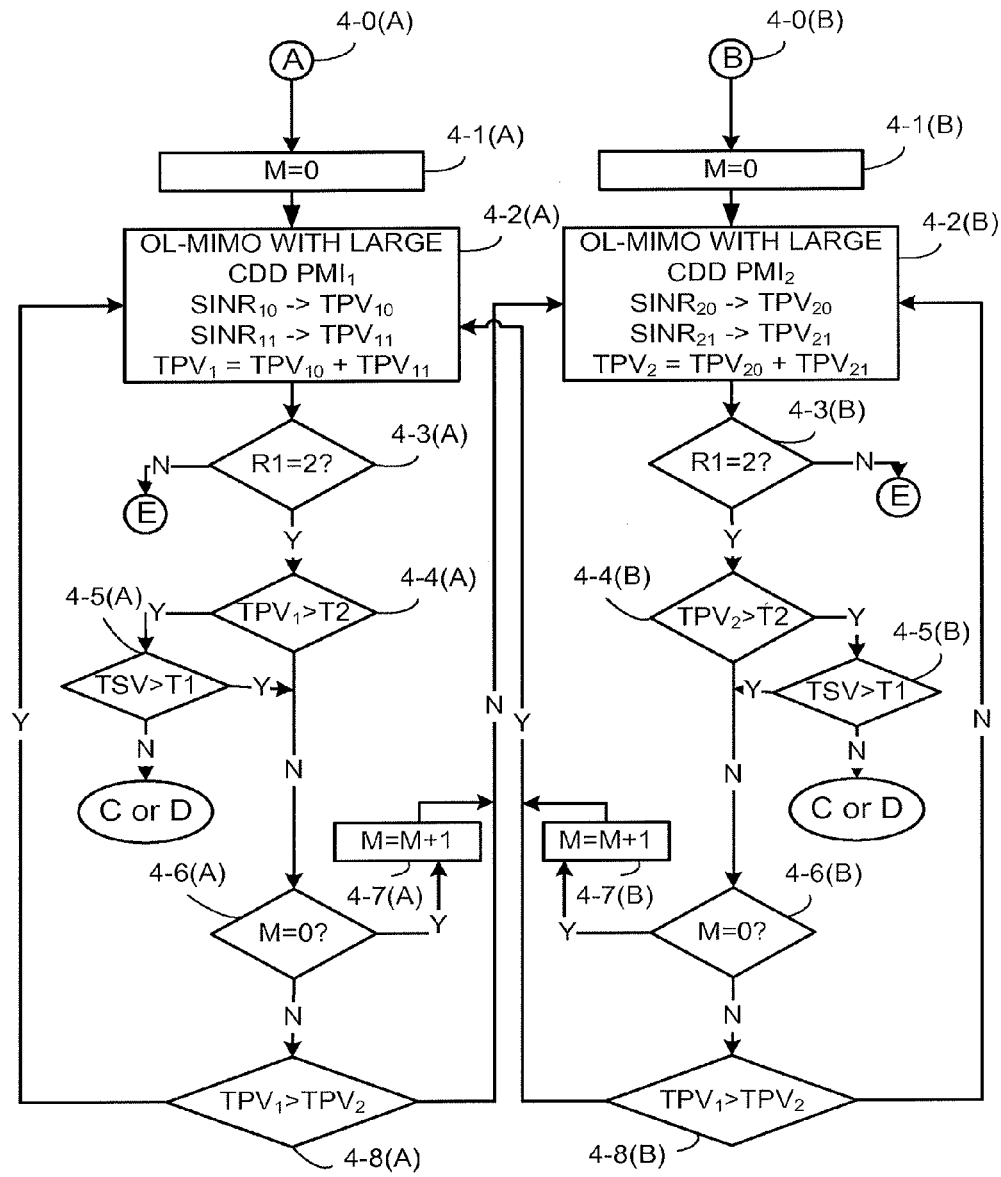
FIG. 4 is a flowchart showing basic acts performed by a MIMO mode switch controller according in a first mode of open loop MIMO which operates with cyclical diversity delay.
Figure 5:
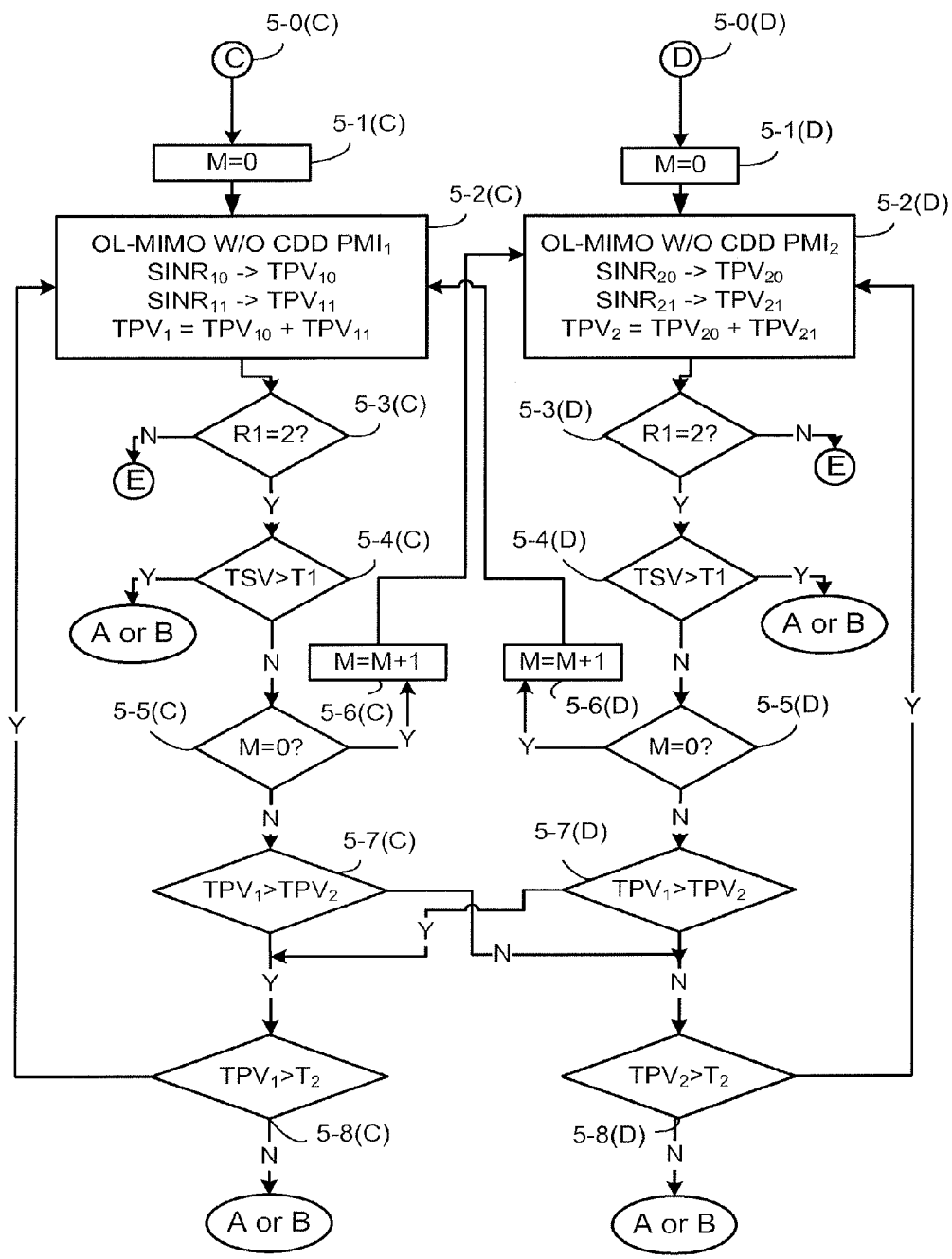
FIG. 5 is a flowchart showing basic acts performed by a MIMO mode switch controller according in a second mode of open loop MIMO which operates without cyclical diversity delay.

Basic example acts or steps of the first mode (open loop MIMO which operates with cyclical diversity delay) and second mode (open loop MIMO which operates without cyclical diversity delay) as executed by transmit switch controller 40 are shown in FIG. 4 and FIG. 5, respectively. Among the acts involved, FIG. 4 shows the conditions needed to switch from OL-MIMO with large CDD to SFBC or OL-MIMO without CDD. Conversely, FIG. 5 shows the conditions needed to switch from OL-MIMO without CDD to SFBC or OL-MIMO with large CDD. FIG. 5 shows the conditions needed to switch from SFBC to OL-MIMO with large CDD or from SFBC to OL-MIMO without CDD.

Figure 6:
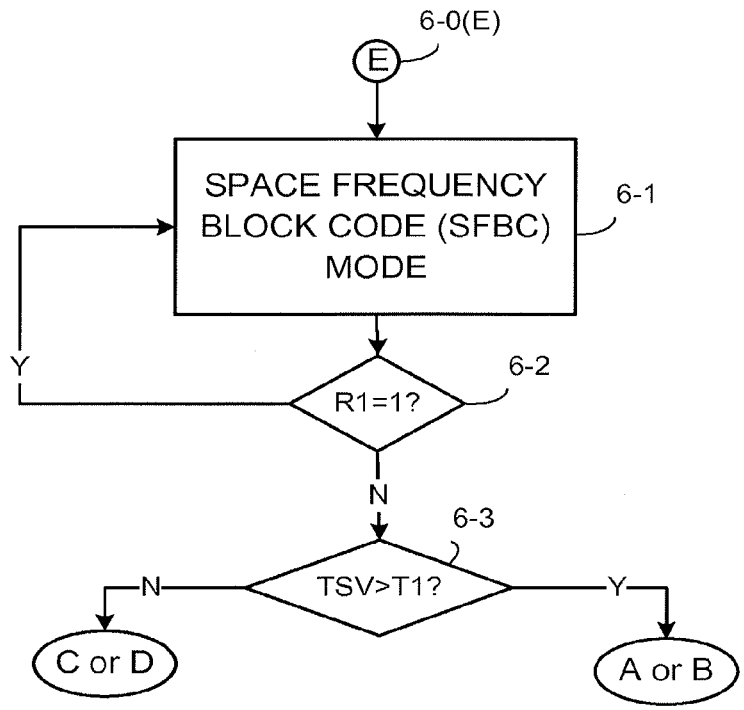
FIG. 6 is a flowchart showing basic acts performed by a MIMO mode switch controller according in a third mode (e.g., a rank one mode such as a space frequency block code (SFBC) mode).

FIG. 4 illustrates two alternative entry points for the first mode (open loop MIMO which operates with cyclical diversity delay): entry point 4-0(A) and entry point 4-0(B). Similarly, FIG. 5 illustrates two alternative entry points for the second mode (open loop MIMO which operates without cyclical diversity delay): entry point 5-0(C) and entry point 5-0(D). FIG. 5 illustrates only one entry point for the third mode (space frequency block code [SFBC] mode): entry point 6-0(E). For sake of brevity, these five entry points are also shown in FIG. 4, FIG. 5, and FIG. 6 as symbols which internally include an appropriate one of the letters "A"-"E", respectively, and textual reference to these entry points may also simply be in terms of the letters "A"-"E".

As indicated above, Rank Indication (RI) is reported by wireless terminal 30. The Rank Indication (RI) determines whether the transmit switch controller 40 switches to space frequency block code (SFBC) or not, e.g., whether the transmit switch controller 40 jumps to entry point 6-0(E) of FIG. 6. As a general rule, when RI=1, SFBC is used. Alternatively, when RI=2, either first mode (open loop MIMO which operates with cyclical diversity delay) or second mode (open loop MIMO which operates without cyclical diversity delay) is employed.

FIG. 4 comprises essentially two branches of logic: a first branch or "A" branch which may be initiated through entry point 4-0(A) and a second branch or "B" branch which may be initiated through entry point 4-0(B). Similarly, FIG. 5 comprises essentially two branches of logic: a first branch or "C" branch which may be initiated through entry point 4-0(C) and a second branch or "D" branch which may be initiated through entry point 4-0(D). The two branches of FIG. 4 are essentially mirror images of each other, although some of the acts of one branch may use different variables (and consequently different variable values) than its mirrored branch. The same quasi-mirroring also exists with branches C and D of FIG. 5.

Differences between the two branches include a different Precoding Matrix Indicator (PMI) used for each, which in turn affects the SINR (Signal to Interference plus Noise Ratio) value and the throughput value (which are ultimately determined by which Precoding Matrix Indicator (PMI) is employed for the branch).

For the case of Rank Indication (RI)=2, two PMIs are considered in both the first mode (open loop MIMO which operates with cyclical diversity delay) and the second mode (open loop MIMO which operates without cyclical diversity delay). The two PMIs are described in Expression 1.

$$PMI_1 = \frac{1}{2}\begin{pmatrix} 1 & 1 \\ 1 & -1 \end{pmatrix} \text{ and } PMI_2 = \frac{1}{2}\begin{pmatrix} 1 & 1 \\ j & -j \end{pmatrix} \quad \text{Expression (1)}$$

In general, the left branch of FIG. 4 (the "A" branch) and the left branch of FIG. 5 (the "C" branch) are processed based on the first Precoding Matrix Indicator (PMI$_1$), and the right branch of FIG. 4 (the "B" branch) and the right branch of FIG. 5 (the "D" branch) are processed based on the second Precoding Matrix Indicator (PMI$_2$).

Besides Rank Indication (RI) and terminal speed, the throughput value is also used as input to the determination whether to switch between different PMIs. In FIG. 4 and FIG. 5 the throughput value is denoted by "TPV", and is determined by the signal to noise and interference ratio (SINR) in a manner such as that described herein by way of example.

As mentioned previously, the throughput, and thus the throughput value, is the number of information bits per resource element (RE). As used herein, in some instances the throughput value is generally represented as TVP, in other instances the throughput value is exemplified as having one subscript (e.g., TVP$_i$), and in yet other instances the throughput value is exemplified as having two subscripts (e.g., TVP$_{ij}$). In such notation, the first subscript ("i") indicates the PMI number and the second subscript ("j") indicates a code word. For instance, TPV$_{10}$ represents the throughput value for PMI$_1$ and code word 0; TPV$_{21}$ represents the throughput value for PMI$_2$ and code word 1; etc. In general, within a mode the PMI with the higher throughput value will be selected.

A counter "M" is used in the techniques depicted by FIG. 4 and FIG. 5 to indicate if a throughput value for a different PMI is available or not. The above-mentioned comparison of throughput values can only be done when the throughput values for both PMIs are available.

In executing the logic of FIG. 4 and FIG. 5 for the first mode (open loop MIMO which operates with cyclical diversity delay) and second mode (open loop MIMO which operates without cyclical diversity delay), respectively, the transmit switch controller 40 uses a throughput threshold (T2) in making its determination whether the OL-MIMO with large CDD or OL-MIMO without CDD should be used. In general, when the throughput value is low, the OL-MIMO with large CDD should be used. Fortuitously, in the first mode (open loop MIMO which operates with cyclical diversity delay), the throughput value for each code word is the same, and thus some simplifications of the implementation can be realized. But the second mode (open loop MIMO which operates without cyclical diversity delay) involves two codewords, e.g., a first codeword and a second codeword, and the throughput values are different with respect to those two codewords.

The two branches of FIG. 4, e.g., branch A of FIG. 4 and branch B of FIG. 4 generally follow a similar logic scheme. Therefore, branch A and branch B are herein generally discussed collectively. In general, the nomenclature X-Y(Z) is employed to discuss the respective acts of FIG. 4 and FIG. 5, with X representing the figure and the preamble of each act (e.g., FIG. 4 or FIG. 5), Y representing the number of the act in the branch (e.g., 0 through 8); and Z representing the branch (e.g., branch A, B, C, or D).

After entry at the respective entry point act 4-0(Z), at act 4-1(Z) each of branch A and branch B initializes its counter M to zero. It will be recalled that "M" is used in FIG. 4 to indicate if a throughput value for a different PMI is available or not.

As mentioned above, a first Precoding Matrix Indicator ($PMI_1$) is applicable to both branch A of FIG. 4 and branch C of FIG. 5 and a second Precoding Matrix Indicator ($PMI_2$) is applicable to both branch B of FIG. 4 and branch D of FIG. 5. In conventional practice PMI may be calculated by the wireless terminal based on the channel condition derived from the received signals. However, in the technology disclosed herein the node 28 (e.g., eNB) decides which PMI will be used based on throughput (e.g., the throughput value). Moreover, the PMIs may, at least in some example embodiments, be fixed. For the two acts generically represented as act 4-2(Z), Table 2 illustrates the values are determined for each act:

TABLE 2

VALUES DETERMINED FROM PMI

| Act 4-2(A) | Act 4-2(B) | Act 5-2(C) | Act 5-2(D) |
|---|---|---|---|
| $SINR_{10} \rightarrow TPV_{10}$ | $SINR_{20} \rightarrow TPV_{20}$ | $SINR_{10} \rightarrow TPV_{10}$ | $SINR_{20} \rightarrow TPV_{20}$ |
| $SINR_{11} \rightarrow TP_{11}$ | $SINR_{21} \rightarrow TPV_{21}$ | $SINR_{11} \rightarrow TPV_{11}$ | $SINR_{21} \rightarrow TPV_{21}$ |
| $TPV_1 = TPV_{10} + TPV_{11}$ | $TPV_2 = TPV_{20} + TPV_{21}$ | $TPV_1 = TPV_{10} + TPV_{11}$ | $TPV_2 = TPV_{20} + TPV_{21}$ |

Act 4-3(Z) comprises the transmit switch controller 40 checking to determine whether the Rank Indication (RI) is equal to 2. If the Rank Indication (RI) is less than 2, the transmit switch controller 40 jumps to the space frequency block code (SFBC) mode, e.g., entry point "E" or act 6-0(E) of FIG. 6. If the Rank Indication (RI) does equal 2, a check is made by transmit switch controller 40 as act 4-4(Z) whether the appropriate throughput value for the respective branch Z is greater than a second threshold, the throughput threshold (T2). Like the threshold T1, the throughput threshold T2 may also be derived from simulation and/or field measurements. The thresholds T1 and T2 may be the same for all branches.

In the first mode, if the check of act 4-4(Z) is positive, e.g., if the throughput value is greater than the second threshold, as act 4-5(Z) the transmit switch controller 40 checks whether the terminal speed value exceeds a first threshold, e.g., a terminal speed threshold T1. The terminal speed threshold T1 may be derived from simulation and/or field measurements. If the terminal speed value TSV does not exceed the first threshold T1, the transmit switch controller 40 knows to jump to the second mode (open loop MIMO which operates without cyclical diversity delay), e.g., to jump either to act 5-0(C) or to act 5-0(D). Whether the jump occurs to act 5-0(C) or to act 5-0(D) may be randomly determined, and it is not important at any particular time whether the jump is to act 5-0(C) or to act 5-0(D). It is preferred, however, that when jumping to another mode that jumps to different entry points be approximately equally distributed, or at least that the jump not always or predominately be to any particular one of the two possible entry points C or D. The same is true for other jumps described herein, e.g., a jump from the second mode to act 4-0(A) or to act 4-0(B).

In the first mode (open loop MIMO which operates with cyclical diversity delay), if the terminal speed value exceeds the terminal speed threshold T1, or if the throughput value for the respective branch Z is less than the second threshold T2, the transmit switch controller 40 continues with act 4-6(Z).

As act 4-6(Z) the transmit switch controller 40 checks whether the value of counter M is zero. If the counter M is zero, the transmit switch controller 40 realizes that it has not yet been able to compute a throughput value for both Precoding Matrix Indicators (PMIs), and then prepares to do so by executing act 4-7(Z). Act 4-7(Z) comprises incrementing counter M (e.g., M=M+1). Then transmit switch controller 40 jumps to act 4-2(Z) of the mirrored branch. For example, after act 4-7(A) transmit switch controller 40 jumps to act 4-2(B) in order to determine the values which appear in the second column of Table 2. Conversely, after act 4-7(B) the transmit switch controller 40 jumps to act 4-2(A) in order to determine the values which appear in the first column of Table 2. Executing the act 4-2(Z) enables the transmit switch controller 40 to obtain both throughput values for the mode.

If the counter M as determined at act 4-6(Z) is not zero, transmit switch controller 40 executes act 4-8(Z) of each branch in order to compare the two values $TPV_1$ and $TPV_2$. Whichever of the two values $TPV_1$ and $TPV_2$ is the greater determines which in branch of the mode the transmit switch controller 40 will continue to execute. For example, in the first mode, if $TPV_1$ is greater than $TPV_2$, execution will remain in or jump to branch A; if $TPV_1$ is not greater than $TPV_2$, execution will remain in or jump to branch B.

Thus, it can be seen that for the first mode (open loop MIMO which operates with cyclical diversity delay) of FIG. 4 the transmit switch controller 40 uses a first precoding matrix indicator to determine a first mode/first PMI throughput value which is used for the first mode throughput value when performing act 4-4(A), but uses a second precoding matrix indicator to determine a first mode/second PMI throughput value which is used for the first mode throughput value when performing act 4-4(B). Further, if the first mode/first PMI throughput value exceeds the first mode/second PMI throughput value (as determined at either of acts 4-8(A) or 4-8(B), the transmit switch controller 40 uses the first mode/first PMI throughput value as the first mode throughput value when repeating act 4-4(A). On the other hand, if the first mode/first PMI throughput value does not exceed the first mode/second PMI throughput value, the transmit switch controller 40 uses the first mode/second PMI throughput value as the first mode throughput value when repeating act 4-4(B).

The two branches of and FIG. 5, e.g., branch C of FIG. 5, and branch D of FIG. 5, generally follow a similar logic scheme. Therefore, these two branches are herein generally discussed collectively, with the nomenclature X-Y(Z) being employed to discuss the respective acts, in which X represents the figure and the preamble of each act (i.e., FIG. 5), Y represents the number of the act in the branch (e.g., 0 through 8); and Z represents the branch (e.g., branch C, or D).

After entry at the respective entry point act 5-0(Z), at act 5-1(Z) each branch initializes its counter M to zero. It will be recalled that "M" is used to indicate if a throughput value for a different PMI is available or not.

As understood from the foregoing, a first Precoding Matrix Indicator ($PMI_1$) is applicable to branch C of FIG. 5 and a second Precoding Matrix Indicator ($PMI_2$) is applicable to branch D of FIG. 5. For the two acts generically represented as act 5-2(Z), Table 2 above illustrates the values are determined for each act.

Act 5-3(Z) comprises the transmit switch controller 40 checking to determine whether the Rank Indication (RI) is equal to 2. If the Rank Indication (RI) is not equal to 2, the transmit switch controller 40 jumps to the space frequency block code (SFBC) mode, e.g., entry point "E" or act 6-0(E) of FIG. 6. If the Rank Indication (RI) is equal to 2, a check is made by transmit switch controller 40 as act 5-4(Z) whether the terminal speed value exceeds the first threshold, e.g., the terminal speed threshold T1. As indicated above, in the second mode (open loop MIMO which operates without cyclical diversity delay), if the terminal speed value TSV exceeds the terminal speed threshold T1, transmit switch controller 40 switches from the second mode to the first mode, e.g., jumps either to act 4-0(A) or to act 4-0(B). As mentioned above, whether the jump occurs to act 4-0(A) or to act 4-0(B) may be randomly determined. If it is determined at act 5-4(Z) that the terminal speed value does not exceed the first threshold, e.g., the terminal speed threshold T1, as act 5-5(Z) the transmit switch controller 40 checks if the value of counter M is zero. If the counter M is zero, the transmit switch controller 40 realizes that it has not yet been able to compute a throughput value for both Precoding Matrix Indicators (PMIs), and then prepares to do so by executing act 5-6(Z). Act 5-6(Z) comprises incrementing counter M (e.g., M=M+1). After incrementing the counter M the transmit switch controller 40 jumps to act 5-2(Z) of the mirrored branch. For example, after act 5-7(C) transmit switch controller 40 jumps to act 5-2(D) in order to determine the values which appear in the fourth column of Table 2. Conversely, after act 5-7(D) the transmit switch controller 40 jumps to act 5-2(C) in order to determine the values which appear in the third column of Table 2. Executing the act 5-2(Z) enables the transmit switch controller 40 to obtain both throughput values for the mode.

If it is determined at act 5-5(Z) that the counter M is not zero, as act 5-7(Z) the transmit switch controller 40 checks whether the throughput value for branch C (e.g., $TPV_1$) is greater than the throughput value for branch D (e.g., $TPV_2$). If it is determined as act 5-7(C) that $TPV_1$ is not greater than $TPV_2$, execution jumps to act 5-8(D). But if it is determined as act 5-7(C) that $TPV_1$ is greater than $TPV_2$, then execution continues at act 5-8(C). Conversely, if it is determined as act 5-7(D) that $TPV_1$ is greater than $TPV_2$, execution jumps to act 5-8(C). But if it is determined as act 5-7(D) that $TPV_1$ is not greater than $TPV_2$, then execution continues at act 5-8(D).

Act 5-8(Z) involves the transmit switch controller 40 checking whether the appropriate throughput value for the respective branch Z is greater than the second threshold, the throughput threshold (T2). Like the threshold T1, the throughput threshold T2 may also be derived from simulation and/or field measurements. The thresholds T1 and T2 may be the same for all branches. If the throughput value for the respective branch Z is greater than the second threshold, the throughput threshold (T2), execution remains in the same branch (e.g., execution jumps back to act 5-2(Z)). But if the throughput value for the respective branch Z is not greater than the second threshold, the transmit switch controller 40 knows to jump to the first mode (open loop MIMO which operates with cyclical diversity delay), e.g., to jump either to act 4-0(A) or to act 4-0(B).

Thus it can be seen that when performing the second mode (open loop MIMO which operates without cyclical diversity delay) the transmit switch controller 40 uses a first precoding matrix indicator $PMI_1$ to determine a second mode/first PMI throughput value which is used for the second mode throughput value when performing branch C including act 5-7(C), and uses a second precoding matrix indicator $PMI_2$ to determine a second mode/second PMI throughput value which is used for the second mode throughput value when performing branch D including act 5-7(D). In the second mode the transmit switch controller 40 compares a maximum of the second mode/first PMI throughput value ($TPV_1$) and the second mode/second PMI throughput value ($TPV_2$) [such maximum being determined at act 5-7(c) and 5-7(D)] to the throughput threshold (T2). If the maximum of the second mode/first PMI throughput value and the second mode/second PMI throughput value does not exceed the throughput threshold, the transmit switch controller 40 switches the downlink transmission to the first mode. Otherwise, (a) if it is determined at act 5-8(C) that the maximum of the second mode/first PMI throughput value and the second mode/second PMI throughput value is the second mode/first PMI throughput value, branch C of the second mode is repeated using the second mode/first PMI throughput value as the second mode throughput value; or (b) If it is determined at act 5-8(D) that the maximum of the second mode/first PMI throughput value and the second mode/second PMI throughput value is the second mode/second PMI throughput value, branch D of the second mode is repeated using the second mode/second PMI throughput value as the second mode throughput value.

FIG. 6 illustrates example acts or steps which are performed in a third mode (space frequency block code (SFBC) mode). Act 6-1 generally reflects operation of the base station node and wireless terminal in the space frequency block code (SFBC) mode. Periodically or as otherwise appropriate as act 6-2 the transmit switch controller 40 checks to ensure that the Rank Indicator (RI) is equal to 1, e.g., to ensure that the space frequency block code (SFBC) mode is still appropriate. If the Rank Indicator (RI) is equal to 1, execution remains in the space frequency block code (SFBC) mode. But if the Rank Indicator (RI) has changed to a value other than 1, act 6-3 is performed. Act 6-3 comprises checking if the terminal speed value (TSV) is greater than the terminal speed threshold (T1). If the terminal speed value (TSV) is greater than the terminal speed threshold (T1), execution jumps to the first mode (open loop MIMO which operates with cyclical diversity delay), e.g., to act 4-0(A) or act 4-0(B) (see FIG. 4). On the other hand, if the terminal speed value (TSV) is not greater than the terminal speed threshold (T1), execution jumps to the second mode (open loop MIMO which operates without cyclical diversity delay), e.g., to act 5-0(C) or act 5-0(D) (see FIG. 5). When jumping to any particular mode, the jump may randomly occur to either branch of the mode. The node 28 estimates throughput value (TPV). First, the Signal to Interference plus Noise power Ratio (SINR) is estimated based on the channel quality indicator (CQI) report. Then the throughput value is derived from SINR through a look-up table. To combat systematic errors between the wireless terminal measurement and the base station link adaptation, an outer-loop adjustment of the gain to interference noise ratio (GINR) based on HARQ ACK/NACK feedback is used. For OL-MIMO without CDD, the base station tracks the GINR (channel Gain to Interference plus Noise Ratio) for each codeword.

Figure 7:
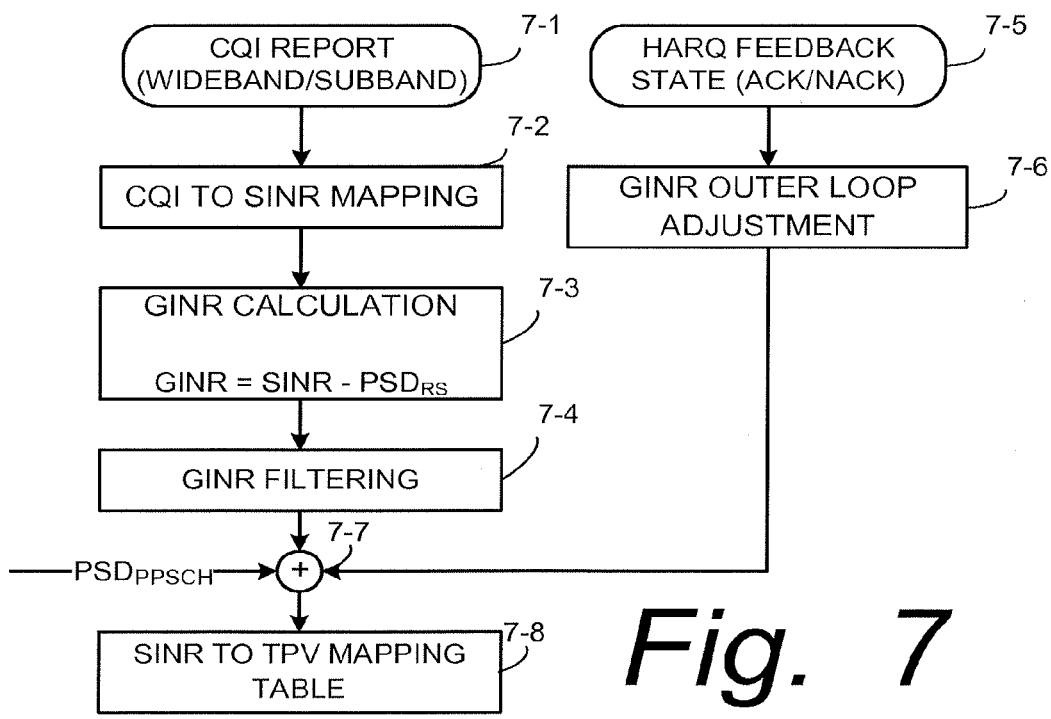
FIG. 7 is a flowchart showing basic acts performed by a MIMO mode switch controller shows in performing a throughput estimation technique.

FIG. 7 shows basic acts or steps comprising a throughput estimation technique according to an example, non-limiting implementation. Act 7-1 comprises the node 28 receiving the CQI report from the wireless terminal 30. Act 7-2 comprises mapping the CQI to SINR using a table derived from receiver link models. Act 7-3 comprises deriving GINR from SINR by subtracting the power spectrum density of the reference signal ($PSD_{RS}$). Act 7-4 comprises applying a smoothing filter to GINR to follow the slow fading. Act 7-5 shows receipt of HARQ ACK/NACK feedback. Act 7-6 comprises using the HARQ ACK/NACK feedback to adjust GINR to combat systematic errors between UE measurement and node link adaptation. Act 7-7 comprises the SINR calculation by adding the filter-smoothed GINR value, the effect of the HARQ ACK/NACK feedback, and the power spectrum density of PDSCH signal ($PSD_{PDSCH}$). Act 7-8 depicts the output of the resultant throughput value estimation, which can be used for both transmission switching and link adaptation algorithm performed by controller 36. Link adaptation, or adaptive coding and modulation (ACM), is employed by controller 36 for matching of the modulation, coding and other signal and protocol parameters to the conditions on the radio link (e.g., the pathloss, the interference due to signals coming from other transmitters, the sensitivity of the receiver, the available transmitter power margin, etc.). It will be understood from the foregoing that HARQ feedback is used to adjust the GINR, and thus as a consequence to adjust the throughput value.

For the first mode (open loop MIMO which operates with cyclical diversity delay), throughput value estimation for one codeword is required since both code words experience the same channel condition. For the second mode (open loop MIMO which operates without cyclical diversity delay), on the other hand, the throughput value needs to be estimated separately for each code word, since the two code words have different channel conditions.

Figure 8:
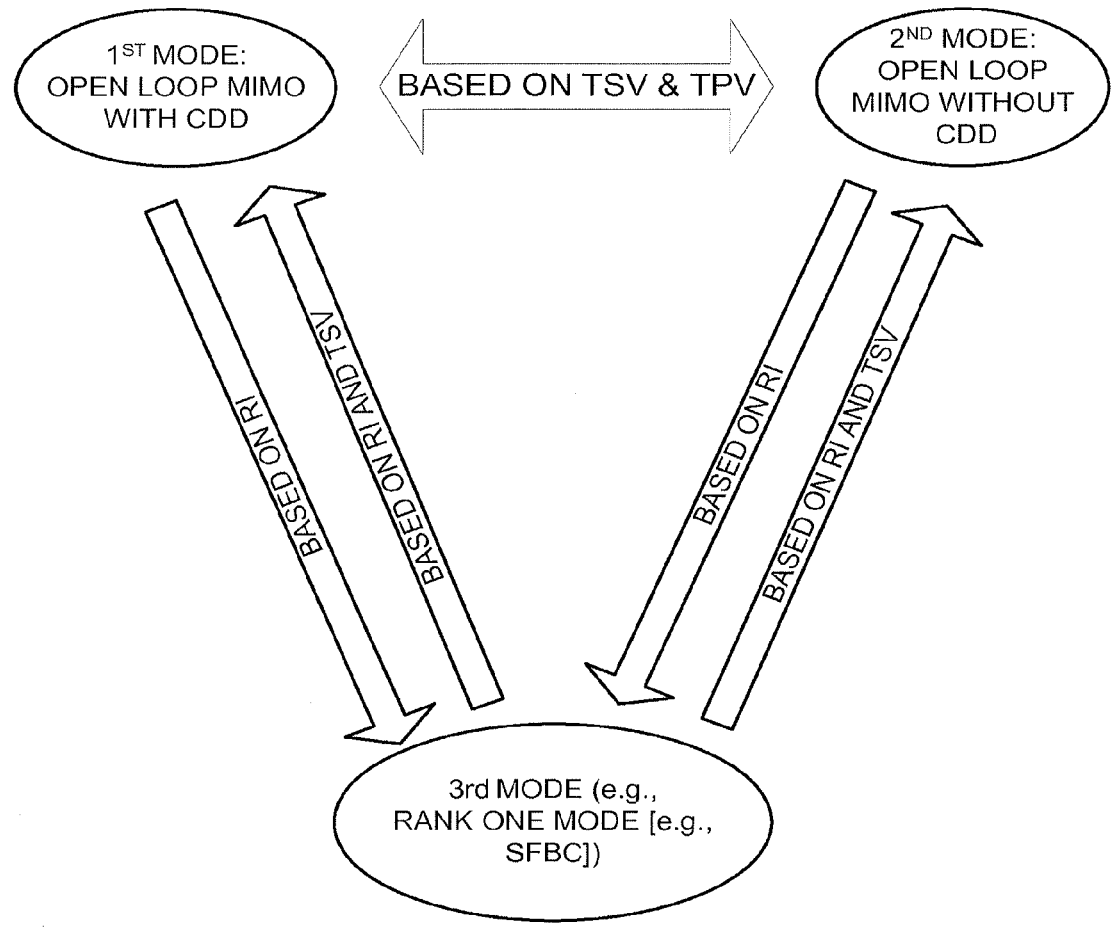
FIG. 8 is a diagrammatic view illustrating switching between the three transmission modes of FIG. 2.

By way of example, FIG. 8 illustrates switching between the three transmission modes of FIG. 2, and the criteria or parameters that may be utilized by transmit switch controller 40 in conjunction with the switching decision. The switching between the first mode (open loop MIMO which operates with cyclical diversity delay) and the second mode (open loop MIMO which operates without cyclical diversity delay) may be based on the terminal speed value (TSV) [e.g., Doppler] and the throughput value (TPV), as discussed above. The switching between the third mode (SFBC mode) and either of the first mode (open loop MIMO which operates with cyclical diversity delay) and the second mode (open loop MIMO which operates without cyclical diversity delay) may be based on the rank indicator (RI) and the throughput value (TPV). When the rank indicator (RI) has a value of "1", the transmit switch controller 40 must switch to the third mode (SFBC mode). But a rank indicator (RI) of greater than "1" does not necessarily mean that a rank one transmission mode of greater than "1" must be selected. While it is true that a higher the rank indicator generally suggests switching to a MIMO transmission mode, in some instances the channel quality may be too low to justify a MIMO transmission mode. In other words, if the throughput value (TPV) is too low, a rank one transmission mode such as SFBC may be selected even if the rank indicator (RI) is greater than one.

To facilitate the ensuing discussion of how the GINR (channel Gain to Interference plus Noise Ratio) values are derived or adjusted, Table 3 provides terminology explanations.

TABLE 3

GINR TERMINOLOGY

| Terminology | Explanation |
|---|---|
| GINR_init | The initial GINR derived from the filtered CQI reports |
| GINR_Adj | The GINR adjustment determined from HARQ feedbacks |
| GINR | The final GINR determined from the sum of GINR and GINR_Adj |
| GINR_UpStep | GINR step size for upgrade which depends on the BLER target |
| GINR_DownStep | GINR step size for downgrade which depends on the BLER target |

With the benefit of FIG. 7 and the above explanations, various techniques for GINR outer-loop adjustment are now described, including (in presentation order) GINR outer-loop adjustment for space frequency block code (SFBC) [mode 3]; GINR outer-loop adjustment for the first mode (open loop MIMO which operates with cyclical diversity delay); and GINR outer-loop adjustment for the second mode (open loop MIMO which operates without cyclical diversity delay).

Since space frequency block code (SFBC) [third mode] has only one codeword, its GINR outer-loop adjustment is understood with reference to Expressions (2). GINR is derived from SINR and PDSCH signal power spectrum density as shown in FIG. 7.

GINR_Adj=GINR_Adj+GINR_UpStep if HARQ is ACK
GINR_Adj=GINR_Adj−GINR_DownStep
  if HARQ is NACK        Expressions (2):

The final GINR may be calculated as shown in Expression (3).

GINR=GINR_init+GINR_Adj        Expression (3):

For the first mode (open loop MIMO which operates with cyclical diversity delay), GINR estimation for one codeword is required since both code words experience the same channel condition. If HARQ for both code words is ACK, Expression (4) is employed. If HARQ for both code words is NACK, Expression (5) is employed. If HARQ for one code word is ACK and the other is NACK, Expression (6) is employed. The final GINR for both code words can be calculated as Expression (7).

GINR_Adj=GINR_Adj+2*GINR_UpStep        Expression (4):

GINR_Adj=GINR_Adj−2*GINR_DownStep        Expression (5):

GINR_Adj=GINR_Adj+GINR_UpStep−
  GINR_DownStep        Expression (6):

GINR=GINR_init+GINR_Adj        Expression (7):

From the foregoing it can thus be understood that, in an example implementation of the first mode, feedback is obtained for both a first codeword and a second codeword transmitted on the downlink. In such example implementation the controller is configured to determine at least one of the first mode/first PMI throughput value and the first mode/second PMI throughput value using an initial value and a differential value. In an example embodiment, the first mode throughput value (whether for the first PMI or the second PMI) is determined by: adding twice a ratio up-step value to a previous ratio value if the feedback for both the first codeword and the second codeword is a positive acknowledgement; subtracting twice a ratio down-step value from the previous ratio value if the feedback for both the first codeword and the second codeword is a negative acknowledgement; and, adding a difference between the ratio up-step value and the ratio down-step value to the previous ratio value if the feedback for the one codeword is a positive acknowledgement and the feedback for the other codeword is a negative acknowledgement.

For the second mode (open loop MIMO which operates without cyclical diversity delay), the GINR needs to be estimated separately for each code word, since they experience different channel conditions. Accordingly, the GINR estimation for the second mode results in two estimations: GINR0 and GINR1, as reflected by Expression (11) and Expression (12), respectively. Preparatory acts leading to the eventual estimates involve estimating GINR_Adj0 and GINR_Adj1. GINR_Adj0 may be estimated using an appropriate one of Expression (7) and Expression (8). GINR_Adj1 may be estimated using an appropriate one of Expression (9) and Expression (10).

GINR_Adj0=GINR_Adj0+GINR_UpStep if HARQ for codeword 0 is ACK     Expression (7):

GINR_Adj0=GINR_Adj0−GINR_DownStep if HARQ for codeword 0 is NACK     Expression (8):

GINR_Adj1=GINR_Adj1+GINR_UpStep if HARQ for codeword 1 is ACK     Expression (9):

GINR_Adj1=GINR_Adj1−GINR_DownStep if HARQ for codeword 1 is NACK     Expression (10):

GINR0=GINR_init+GINR_Adj0     Expression (11):

GINR1=GINR init+GINR_Adj1     Expression (12):

At the very beginning of operation, when the wireless terminal is connected to the system, the most conservative GINR_Adj=GINR_Adj_Int is used. Thereafter, the GINR_Adj value can be re-used when the transmission mode is switched from one mode to another. For example, if the transmission mode is switched from either SFBC or the first mode to the second mode, the initial value for two code words can be calculated from Expression (13). On the other hand, if the transmission mode is switched from the second mode to either SFBC or the first mode, the initial value for GINR_Adj can be calculated from the average value of GINR_Adj0 and GINR_Adj1, as shown by Expression (14). There is no change for GINR_Adj with the transmission mode switching between SFBC and the first mode.

GINR_Adj0=GINR_Adj1=GINR_Adj     Expression (13):

GINR_Adj=(GINR_Adj0+GINR_Adj1)/2     Expression (14):

After obtaining GINR values from the above expressions, these can be used to calculate the corresponding SINR values by adding DL PDSCH signal PSD (power spectrum density). The TP values can be derived from SINR by a table look-up method. The SINR to TP mapping table can be derived from computer simulation and field measurements.

Thus, in an example embodiment the controller 40 performs a switch between the plural transmission modes and, after the switch, begins a post-switch transmission mode using a throughput value acquired from the pre-switch transmission mode. For example, when a pre-switch transmission mode uses only one adjusted GINR value for either one codeword or two codewords and a post-switch transmission mode uses two adjusted GINR values for two codewords, after the switch a post-switch transmission mode is begun using the one adjusted GINR value acquired from the pre-switch transmission mode as both of the two adjusted GINR values for the post-switch transmission mode. An another example, when the pre-switch transmission mode uses two adjusted GINR values for two codewords, and the post-switch transmission mode uses one adjusted GINR value for either one codeword or two codewords, the two adjusted GINR values are averaged to obtain the one adjusted GINR value for the post-switch transmission mode.

From the foregoing it can be seen that in the first mode of the example embodiment of FIG. 4 the transmit switch controller 40 uses a first precoding matrix indicator ($PMI_1$) to determine a first mode/first PMI throughput value ($TPV_1$) and a second precoding matrix indicator ($PMI_2$) to determine a first mode/second PMI throughput value ($TPV_2$). If, after performing basic act (1) of FIG. 3, the terminal speed value (TSV) does not exceed the terminal speed threshold (as determined by act 4-4(Z), and if the first mode/first PMI throughput value ($TPV_1$) used as the first mode throughput value does not exceed a first throughput threshold (T2), the transmit switch controller 40 proceeds to perform other first mode acts by essentially repeating basic acts (1) and (2) of FIG. 3, but using the first mode/second PMI throughput value ($TPV_2$) as the first mode throughput value. Then transmit switch controller 40 selects, based on magnitude, either the first mode/first PMI throughput value ($TPV_1$) or the first mode/second PMI throughput value ($TPV_2$) as a chosen throughput value. Then transmit switch controller 40 essentially repeats basic act (1) and basic act (2) of FIG. 3 using as the chosen throughput value for basic act (2) of FIG. 3.

From the foregoing it can be seen that, in an example embodiment of the second mode, transmit switch controller 40 is configured to use a first precoding matrix indicator ($PMI_1$) to determine a second mode/first PMI throughput value ($TPV_1$) and to use a second precoding matrix indicator ($PMI_2$) to determine a second mode/second PMI throughput value ($TPV_2$). In the second mode transmit switch controller 40 is further configured to perform certain other acts if both (a) the terminal speed value (TSV) does exceed the terminal speed threshold (T2) and (b) the second mode/first PMI throughput value ($TPV_1$) does exceed a first throughput threshold (T2). In particular, in such case the controller is configured to repeat basic act (3) and basic (4) but using the second mode/second PMI throughput value ($TPV_2$) as the second mode throughput value for basic act (4). The transmit switch controller 40 is further configured to select, based on magnitude, either the second mode/first PMI throughput value ($TPV_1$) or the second mode/second PMI throughput value ($TPV_2$). Thereafter the controller repeats basic act (3) and basic (4) using as the chosen throughput value for basic act (4).

Further to the foregoing, in an example implementation of the second mode, the controller 40 obtains feedback for both a first codeword and a second codeword transmitted on the downlink (as shown by act 7-5). The transmit switch controller 40 determines the second mode/first PMI throughput value ($TPV_1$) from (i) a second mode/first PMI/first codeword throughput value ($TPV_{10}$) and (ii) a second mode/first PMI/second codeword throughput value ($TPV_{11}$), as reflected by act 5-2(C). The transmit switch controller 40 also determines the second mode/second PMI throughput value (TPV2) from (iii) a second mode/second PMI/first codeword throughput value (TPV$_{20}$) and (iv) a second mode/second PMI/second codeword throughput value (TPV$_{21}$), as reflected by act 5-2(D). During the second mode the transmit switch controller 40 adjusts values of at least one of (i), (ii), (iii) and (iv) in accordance with feedback for the respective codeword (see act 7-7).

It was mentioned above that the plural MIMO modes, e.g., of FIG. 2, may also include other modes. As an example, for a situation in which the Rank Indication (RI) is 1, in another example embodiment the transmit switch controller 40 may switch to a different PMI as defined in the 3GPP standard of reference [1] rather than switch to space frequency block code (SFBC), and thereby perhaps obtain better performance than space frequency block code (SFBC).

As used herein, "terminal" or "wireless terminal" or "user equipment (UE)" may be a mobile station such as a mobile telephone or "cellular" telephone or a laptop with wireless capability, e.g., mobile termination, and thus may be, for example, a portable, pocket, hand-held, computer-included, or car-mounted mobile device which communicates voice and/or data via a radio access network. Moreover, a terminal or wireless terminal or UE may be a fixed terminal which communicates voice and/or data via a radio access network.

In an example embodiment and as depicted by way of example in FIG. 1B and FIG. 2, the controller 36, and indeed transmit switch controller 40, may be realized by a machine platform. To this end FIG. 1B and FIG. 2 employs a broken line to represent machine platform 90 which comprises controller 36 and transmit switch controller 40. The terminology "machine platform" is a way of describing how the functional units of node 28 can be implemented or realized by machine. The machine platform 90 can take any of several forms, such as (for example) electronic circuitry in the form of a computer implementation platform or a hardware circuit platform. A computer implementation of the machine platform may be realized by or implemented as one or more computer processors or controllers as those terms are herein expansively defined, and which may execute instructions stored on non-transient computer-readable storage media. In such a computer implementation the machine platform 90 may comprise, in addition to a processor(s), a memory section (which in turn can comprise random access memory; read only memory; an application memory (a non-transitory computer readable medium which stores, e.g., coded non instructions which can be executed by the processor to perform acts described herein); and any other memory such as cache memory, for example). Another example platform suitable for transmit switch controller 40 is that of a hardware circuit, e.g., an application specific integrated circuit (ASIC) wherein circuit elements are structured and operated to perform the various acts described herein. Similarly, the wireless terminal controller 46 of wireless terminal 30 may be realized by machine platform 91.

Figure 9A:
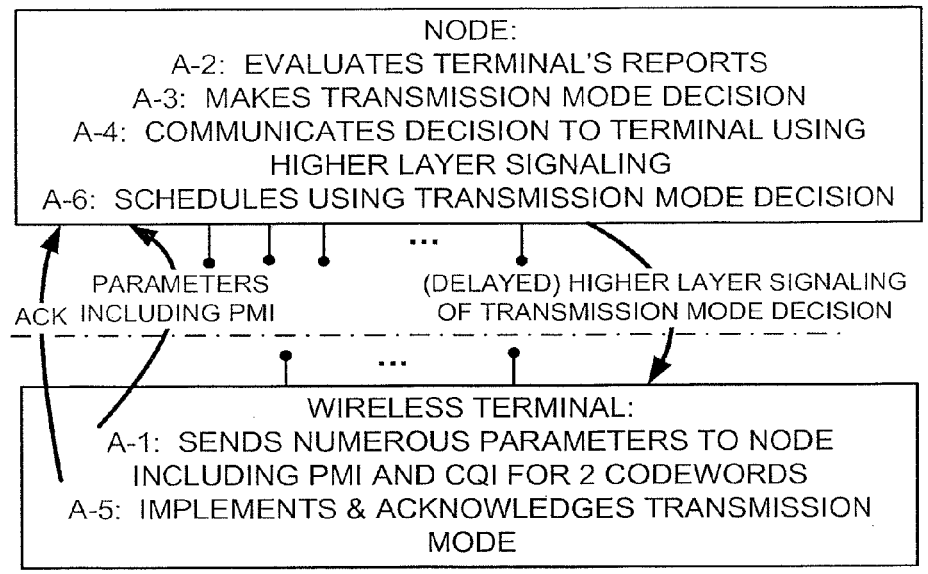
FIG. 9A is a diagrammatic view depicting basic acts involved in selection of transmission mode in a conventional MIMO operation.

In prior art technology as illustrated in FIG. 9A, the base station node made the decision and selection of transmission mode and communicated this decision to the wireless terminal through higher layer signalling. If the transmission mode is closed-loop MIMO, e.g., TM4, the wireless terminal needs to report PMI, RI, and CQIs for two codewords. If the transmission mode is open-loop MIMO, the wireless terminal does not report PMI but reports CQI averaged over two codewords. Based on the wireless terminal report(s), the base station node decides the modulation and coding scheme for each codeword.

Figure 9B:
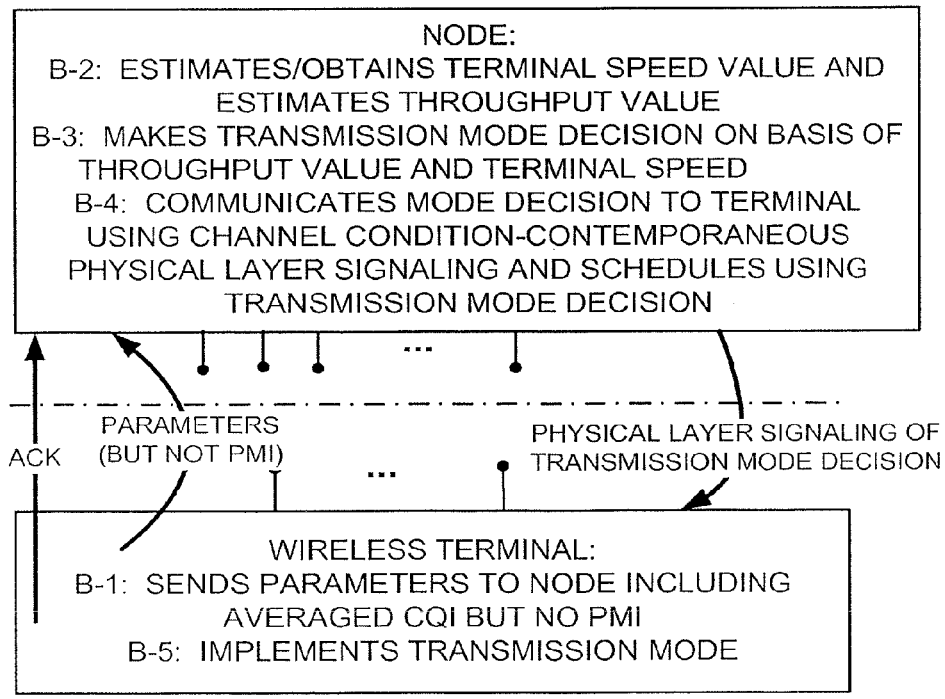
FIG. 9B is a diagrammatic view depicting basic acts involved in selection of transmission mode in MIMO operation according to an example embodiment of the technology disclosed herein.

In contrast to prior art technology, the example embodiments of the technology disclosed herein such as illustrated in FIG. 9B achieve the same advantage of closed loop MIMO while essentially operating in open loop MIMO fashion. Accordingly, as shown in FIG. 9B, the wireless terminal of the technology disclosed herein only needs to report RI and an averaged CQI (e.g., CQI averaged over two codewords). Notably, the wireless terminal need not provide or transmit the Precoder Matrix Indicators (PMIs), Act B-2 shows the base station node estimating or otherwise obtaining the terminal speed value (e.g., a Doppler shift value) and, based on the report(s) from the wireless terminal, estimating the throughput value. As act B-3 the transmission mode selector 40 of base station node makes its transmission mode decision or determination based on the estimated throughput value and the terminal speed value. An example manner in which the throughput value is estimated is understood with reference to FIG. 7, which culminates in act 7-8 as previously described. The transmission mode selector 40 may also consider the rank indicator (RI) provided by the wireless terminal. Then, as act B-4, the base station node communicates the transmission mode decision to the wireless terminal using channel condition-contemporaneous physical layer signaling and implements the transmission mode decision. As act B-5 the wireless terminal implements the transmission mode decided by the base station node, and does not need to send an acknowledgement to the base station because the base station node has already implemented the transmission mode decision and has communicated same using the physical layer signaling, so that the decision signaling occurs at essentially the same time as the user data.

As mentioned above, as act B-4 the base station node communicates its transmission mode decision to the wireless terminal using channel condition-contemporaneous physical layer signaling. By being in the "physical layer" the decision signaling has a relation to the user data that is being transmitted essentially contemporaneously with the physical signaling, rather than being sent as pure, higher layer signaling as in the conventional case of FIG. 9A. The "relation" to the user data means that the decision signaling is in a same or essentially contemporaneous time interval as the user data transport block for which the physical data is to be decoded. A transport block is understood to be a prescribed set of resource elements defined by symbols and frequency carriers. Thus, for example, to be "contemporaneous" the user data may be carried in a PDSCH channel of a transport block, while the physical signaling including the transmission mode decision may be carried in a PDCCH channel of the same time interval. But it should be understood that the physical signaling including the transmission mode decision does not have to be carried in the same time interval as the user data, but may be carried in another time interval so long as another physical layer signal is transmitted at a time in which the channel conditions are essentially the same as the user data-carrying transport block to which the signaling has relation. This ability of the physical layer signaling including the transmission mode decision to be included in another transmission unit, frame, block or interval (e.g., transmission time interval) that experiences essentially the same channel condition is what is meant by "channel condition-contemporaneous physical layer signaling". In other words, the decision/determination of transmission mode is communicated in the physical layer at a point in time that is close enough in time to the user data to which it applies so that essentially the same channel conditions are applicable (e.g., the channel conditions have not appreciably changed) for both the signaling and the user data. Communication of the transmission mode decision using channel condition-contemporaneous physical layer signaling rather than higher layer signaling provides more efficiency by, e.g. avoiding delay and additional overhead (e.g., resource overhead) that attends the higher layer signaling.

In essence, the open loop MIMO techniques employed by example embodiments of the technology disclosed herein, which base the transmission mode decision on throughput value and terminal speed value, essentially provide results comparable to those of a closed loop MIMO technique. This is advantageous since closed loop MIMO generally provides greater throughput. But the closed loop MIMO techniques require communication from the wireless terminal to the base station node of the Precoder Matrix Indicators (PMIs), and accordingly require greater utilization of transmission resources and delay to accommodate the communication of this information. Moreover, in conventional closed loop MIMO techniques the base station node uses the PMI proposed by the wireless terminal. But example embodiments of the technology disclosed herein the transmission mode selector 40 essentially considers, based on throughput value, all transmission constellation options and thereby essentially determines which PMI should be utilized without PMI(s) having to be communicated by the wireless terminal.

Whereas in closed loop MIMO there are at least three constellations corresponding to different PMIs that must be decided by the wireless terminal, the technology disclosed herein by using open loop MIMO has the base station node look at all constellation options and chooses the best PMI that the node can perceive, which is essentially the equivalent of a closed loop MIMO technique, without the overhead of closed loop MIMO (which involved the wireless terminal sending the PMI(s), the CQIs of two codewords, etc.). In so doing, the transmit switch controller 40 calculates the throughput value, and continually checks whether the throughput value based on a first PMI ($PMI_1$) or a second PMI ($PMI_2$) is better. In the prior art this type of comparison between PMIs would have been performed by the wireless terminal, and communication of results of such comparison would be reported as needed to the network node, thereby utilizing additional overhead signaling (which is not required by the technology disclosed herein).

A problem with closed loop MIMO is that the wireless terminal reports the channel conditions (CQIs, PMI, etc.) as it perceived them on the last grant (of resources), which may be several milliseconds previously and therefore may be out-dated. The techniques of the technology disclosed herein, on the other hand, are much more current, e.g., more timely.

For traditional open loop MIMO the PMI is fixed, whether it be a good or bad value. However, for the open loop MIMO techniques of example embodiments of the technology disclosed herein, the transmission mode selector 40 is able to determine a transmission mode based on a best PMI, using the estimated throughput value and terminal speed value.

Thus, as stated above, the open loop MIMO techniques employed by example embodiments of the technology disclosed herein, which base the transmission mode decision on throughput value and terminal speed value, essentially provide results comparable to those of a closed loop MIMO technique, and advantageously provide greater throughput without the increased overhead and complexity of closed loop MIMO operation.

The technology disclosed herein provides numerous advantages. A non-exhaustive list of example advantages include the following:

Reduction in the working load of a wireless terminal because the technology removes the need for a wireless terminal to calculate the Precoding Matrix Indicator (PMI).

Reduction in the uplink control channel overhead because no PMI reports are required.

Usage of same CQI report format and method for both OL-MIMO with large CDD and OL-MIMO without CDD. Only one CQI (averaged over two code words) is reported, thus reducing the uplink control channel overhead further.

Reduction of the open loop to closed loop switch time and simplification of the higher layer signaling (RRC) for transmit mode switching.

Increasing the open loop performance by using more than one PMI. The outer loop measurement for the previous transmission mode may be re-used for the subsequent transmission mode which will avoid producing an outer-loop transient step.

Usage of Doppler and throughput measurements to switch between the MIMO modes, which improves robustness and performance.

The technology disclosed herein advantageously uses use an extremely limited feedback (e.g. CQI and terminal speed value) received from the wireless terminal by the eNB in order to enable the eNB to derive the information usually communicated in CL-MIMO, thereby allowing the eNB to operate in OL-MIMO and benefit from all of the advantages of CL-MIMO without the inconvenience of signaling and use of UL signaling resources, which in turn enables the eNB to have a higher density of wireless terminals operating in MIMO. The technology disclosed herein advantageously provides an implicit closed loop for OL-MIMO which is in sharp contrast to the explicit CL-MIMO or non-minimal limited feedback.

One or more of the following references, all of which are incorporated herein by reference, may be pertinent to one or more aspects of the technology disclosed herein:

[1] 3GPP TS 36.211: "Evolved Universal Terrestrial Radio Access (E-UTRA); Physical channels and modulation".

[2] 3GPP TS 36.212: "Evolved Universal Terrestrial Radio Access (E-UTRA); Multiplexing and channel coding".

[3] 3GPP TS 36.213: "Evolved Universal Terrestrial Radio Access (E-UTRA); Physical layer procedures".

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, mechanical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a node of a radio access network which communicates over a radio interface with a wireless terminal, the method comprising:
    obtaining, by the node, a terminal speed value of the wireless terminal;
    determining to switch between a first transmission mode for communicating with the wireless terminal and a second transmission mode for communicating with the wireless terminal, the determining comprising:
        (1) if the node is configured to use the first transmission mode and the terminal speed value exceeds a terminal speed threshold, then determining not to switch from the first transmission mode to the second transmission mode;
        (2) if the node is configured to use the first transmission mode and the terminal speed value does not exceed the terminal speed threshold, then:
            (2a) obtaining a first mode throughput value;
            (2b) determining to switch to the second transmission mode when the first mode throughput value exceeds a throughput threshold; and
            (2c) determining not to switch from the first transmission mode to the second transmission mode when the first mode throughput value does not exceed the throughput threshold;
        (3) if the node is configured to use the second transmission mode and the terminal speed value exceeds the terminal speed threshold, then determining to switch from the second transmission mode to the first transmission mode; and
        (4) if the node is configured to use the second transmission mode and the terminal speed value does not exceed the terminal speed threshold, then:
            (4a) obtaining a second mode throughput value;
            (4b) determining to switch to the first transmission mode when the second mode throughput value does not exceed the throughput threshold; and
            (4c) determining not to switch from the second transmission mode to the first transmission mode when the second mode throughput value does exceed the throughput threshold.

2. The method of claim 1, further comprising:
    determining a first mode/first PMI throughput value using a first precoding matrix indicator, the first mode/first PMI throughput value used for obtaining the first mode throughput value when performing act (2);
    determining a first mode/second PMI throughput value using a second precoding matrix indicator, the first mode/second. PMI throughput value used for obtaining the first mode throughput value when performing act (2);
    if the first mode/first PMI throughput value exceeds the first mode/second PMI throughput value, then using the first mode/first PMI throughput value as the first mode throughput value when repeating act (2); and
    if the first mode/first PMI throughput value does not exceed the first mode/second PMI throughput value, then using the first mode/second PMI throughput value as the first mode throughput value when repeating act (2).

3. The method of claim 1, further comprising:
    determining a second mode/first PMI throughput value using a first precoding matrix indicator, the second mode/first PMI throughput value used to obtain the second mode throughput value when performing act (4);
    determining a second mode/second PMI throughput value using a second precoding matrix indicator, the second mode/second PMI throughput value used to obtain the second mode throughput value when performing act (4);
    if the node is configured to use the second transmission mode and the terminal speed value does not exceed the terminal speed threshold, then:
        comparing a maximum of the second mode/first PMI throughput value and the second mode/second PMI throughput value to the throughput threshold;
        if the maximum of the second mode/first PMI throughput value and the second mode/second PMI throughput value does not exceed the throughput threshold, determining to switch to the first transmission mode; otherwise:
            when the maximum of the second mode/first PMI throughput value and the second mode/second PMI throughput value is the second mode/first PMI throughput value, repeating act (4) using the second mode/first PMI throughput value as the second mode throughput value; or
            when the maximum of the second mode/first PMI throughput value and the second mode/second PMI throughput value is the second mode/second PMI throughput value, repeating act (4) using the second mode/second PMI throughput value as the second mode throughput value.

4. The method of claim 3, further comprising:
    obtaining feedback for both a first codeword and a second codeword transmitted to the wireless terminal;
    determining the second mode/first PMI throughput value from (i) a second mode/first PMI/first codeword throughput value and (ii) a second mode/first PMI/second codeword throughput value;
    determining the second mode/second PMI throughput value from (iii) a second mode/second PMI/first codeword throughput value and (iv) a second mode/second PMI/second codeword throughput value; and
    adjusting values of at least one of (i), (ii), (iii) and (iv) in accordance with feedback for the respective codeword.

5. The method of claim 2, wherein at least one of obtaining the first mode throughput value and obtaining the second mode throughput value comprises:
    determining a signal to interference plus noise ratio (SINR) for a codeword using a channel quality indication reported by the wireless terminal;
    deriving a channel gain to interference noise ratio (GINR) from the SINR by subtracting a power spectrum density of a reference signal (PSDRs);
    applying a smoothing filter to the GINR to obtain a smoothed GINR value;
    adjusting the GINR to obtain an adjusted GINR value using HARQ ACK/NACK feedback;

obtaining a throughput value for the codeword using the smoothed GINR value, the adjusted GINR value, and a power spectrum density of a PDSCH signal.

6. The method of claim 5, wherein adjusting the GINR to obtain an adjusted GINR value using HARQ ACK/NACK feedback if the node is configured to use the first transmission mode comprises:
adding twice an up-step value to a previous GINR adjusted value if the HARQ feedback for both a first codeword and a second codeword is an ACK;
subtracting twice a down-step value from the previous GINR adjusted value if the HARQ feedback for both the first codeword and the second codeword is a NACK;
adding a difference between the up-step value and the down-step value to the previous GINR adjusted value if the HARQ feedback for one codeword is an ACK and the feedback for the other codeword is a NACK.

7. The method of claim 5, wherein adjusting the GINR to obtain an adjusted GINR value using HARQ ACK/NACK feedback if the node is configured to use the second transmission mode comprises:
adding an up-step value to a previous GINR adjusted value of a first codeword if the HARQ feedback for the first codeword is an ACK;
adding an up-step value to a previous GINR adjusted value of a second codeword if the HARQ feedback for the second codeword is an ACK;
subtracting a down-step value from the previous GINR adjusted value of the first codeword if the HARQ feedback for the first codeword is a NACK; and
subtracting a down-step value from the previous GINR adjusted value of the second codeword if the HARQ feedback for the second codeword is a NACK.

8. The method of claim 5, further comprising:
switching between the first transmission mode and the second transmission mode; and
upon switching between the first transmission mode and the second transmission mode, beginning a post-switch transmission mode using the adjusted GINR acquired from the pre-switch transmission mode.

9. The method of claim 5, further comprising:
when a pre-switch transmission mode uses only one adjusted GINR value for either one codeword or two codewords and a post-switch transmission mode uses two adjusted GINR values for two codewords, after the switch beginning a post-switch transmission mode using the one adjusted GINR value acquired from the pre-switch transmission mode as both of the two adjusted GINR values for the post-switch transmission mode; and
when the pre-switch transmission mode uses two adjusted GINR values for two codewords, and the post-switch transmission mode uses one adjusted GINR value for either one codeword or two codewords, averaging the two adjusted GINR values to obtain the one adjusted GINR value for the post-switch transmission mode.

10. The method of claim 1, comprising communicating the determination to switch between the first transmission mode and the second transmission mode to the wireless terminal using channel condition-contemporaneous physical layer signaling.

11. A node of a radio access network which communicates over a radio interface with a wireless terminal, the node comprising:
a transmitter operable to perform downlink transmission over the radio interface; and a controller operable to:
obtain a terminal speed value of the wireless terminal;
determine to switch between a first transmission mode for communicating with the wireless terminal and a second transmission mode for communicating with the wireless terminal, the determination comprising:
(1) if the node is configured to use the first transmission mode and the terminal speed value exceeds a terminal speed threshold, then determine not to switch from the first transmission mode to the second transmission mode;
(2) if the node is configured to use the first transmission mode and the terminal speed value does not exceed the terminal speed threshold, then:
(2a) obtain a first mode throughput value;
(2b) determine to switch to the second transmission mode when the first mode throughput value exceeds a throughput threshold; and
(2c) determine not to switch from the first transmission mode to the second transmission mode when the first mode throughput value does not exceed the throughput threshold;
(3) if the node is configured to use the second transmission mode and the terminal speed value exceeds the terminal speed threshold, then determine to switch from the second transmission mode to the first transmission mode; and
(4) if the node is configured to use the second transmission mode and the terminal speed value does not exceed the terminal speed threshold, then:
(4a) obtain a second mode throughput value;
(4b) determine to switch to the first transmission mode when the second mode throughput value does not exceed the throughput threshold; and
(4c) determine not to switch from the second transmission mode to the first transmission mode when the second mode throughput value does exceed the throughput threshold.

12. The node of claim 11, the controller further operable to:
determine a first mode/first PMI throughput value using a first precoding matrix indicator, the first mode/first PMI throughput value used for obtaining the first mode throughput value when performing act (2);
determine a first mode/second PMI throughput value using a second precoding matrix indicator, the first mode/second. PMI throughput value used for obtaining the first mode throughput value when performing act (2);
if the first mode/first PMI throughput value exceeds the first mode/second PMI throughput value, then use the first mode/first PMI throughput value as the first mode throughput value when repeating act (2); and
if the first mode/first PMI throughput value does not exceed the first mode/second PMI throughput value, then use the first mode/second PMI throughput value as the first mode throughput value when repeating act (2).

13. The node of claim 11, the controller further operable to:
determine a second mode/first PMI throughput value using a first precoding matrix indicator, the second mode/first PMI throughput value used to obtain the second mode throughput value when performing act (4);
determine a second mode/second PMI throughput value using a second precoding matrix indicator, the second mode/second PMI throughput value used to obtain the second mode throughput value when performing act (4);

if the node is configured to use the second transmission mode and the terminal speed value does not exceed the terminal speed threshold, then:

compare a maximum of the second mode/first PMI throughput value and the second mode/second PMI throughput value to the throughput threshold;

if the maximum of the second mode/first PMI throughput value and the second mode/second PMI throughput value does not exceed the throughput threshold, determine to switch to the first transmission mode; otherwise:

when the maximum of the second mode/first PMI throughput value and the second mode/second PMI throughput value is the second mode/first PMI throughput value, repeat act (4) using the second mode/first PMI throughput value as the second mode throughput value; or when the maximum of the second mode/first PMI throughput value and the second mode/second PMI throughput value is the second mode/second PMI throughput value, repeat act (4) using the second mode/second PMI throughput value as the second mode throughput value.

14. The node of claim 13, the controller further operable to:

obtain feedback for both a first codeword and a second codeword transmitted to the wireless terminal;

determine the second mode/first PMI throughput value from (i) a second mode/first PMI/first codeword throughput value and (ii) a second mode/first PMI/second codeword throughput value;

determine the second mode/second PMI throughput value from (iii) a second mode/second PMI/first codeword throughput value and (iv) a second mode/second PMI/second codeword throughput value; and adjust values of at least one of (i), (ii), (iii) and (iv) in accordance with feedback for the respective codeword.

15. The node of claim 11, the controller further operable to:

determine a signal to interference plus noise ratio (SINR) for a codeword using a channel quality indication reported by the wireless terminal;

derive a channel gain to interference noise ratio (GINR) from the SINR by subtracting a power spectrum density of a reference signal (PSDRs);

apply a smoothing filter to the GINR to obtain a smoothed GINR value;

adjust the GINR to obtain an adjusted GINR value using HARQ ACK/NACK feedback;

obtain a throughput value for the codeword using the smoothed GINR value, the adjusted GINR value, and a power spectrum density of a PDSCH signal.

16. The node of claim 15, when the node is configured to use the first transmission mode, the controller is further operable to:

add twice an up-step value to a previous GINR adjusted value if the HARQ feedback for both a first codeword and a second codeword is an ACK;

subtract twice a down-step value from the previous GINR adjusted value if the HARQ feedback for both the first codeword and the second codeword is a NACK;

add a difference between the up-step value and the down-step value to the previous GINR adjusted value if the HARQ feedback for one codeword is an ACK and the feedback for the other codeword is a NACK.

17. The node of claim 15, when the node is configured to use the second transmission mode, the controller is further operable to:

add an up-step value to a previous GINR adjusted value of a first codeword if the HARQ feedback for the first codeword is an ACK;

add an up-step value to a previous GINR adjusted value of a second codeword if the HARQ feedback for the second codeword is an ACK;

subtract a down-step value from the previous GINR adjusted value of the first codeword if the HARQ feedback for the first codeword is a NACK; and subtract a down-step value from the previous GINR adjusted value of the second codeword if the HARQ feedback for the second codeword is a NACK.

18. The node of claim 15, the controller further operable to:

switch between the first transmission mode and the second transmission mode; and upon switching between the first transmission mode and the second transmission mode, begin a post-switch transmission mode using the adjusted GINR acquired from the pre-switch transmission mode.

19. The node of claim 15, the controller further operable to:

when a pre-switch transmission mode uses only one adjusted GINR value for either one codeword or two codewords and a post-switch transmission mode uses two adjusted GINR values for two codewords, after the switch begin a post-switch transmission mode using the one adjusted GINR value acquired from the pre-switch transmission mode as both of the two adjusted GINR values for the post-switch transmission mode; and when the pre-switch transmission mode uses two adjusted GINR values for two codewords, and the post-switch transmission mode uses one adjusted GINR value for either one codeword or two codewords, average the two adjusted GINR values to obtain the one adjusted GINR value for the post-switch transmission mode.

20. The node of claim 11, the controller further operable to communicate the determination to switch between the first transmission mode and the second transmission mode to the wireless terminal using channel condition-contemporaneous physical layer signaling.

\* \* \* \* \*